United States Patent
Agarwal et al.

(10) Patent No.: US 11,989,964 B2
(45) Date of Patent: May 21, 2024

(54) TECHNIQUES FOR GRAPH DATA STRUCTURE AUGMENTATION

(71) Applicant: Oracle International Corporation, Redwood Shores, CA (US)

(72) Inventors: Amit Agarwal, Kolkata (IN);
Kulbhushan Pachauri, Bangalore (IN);
Iman Zadeh, Los Angeles, CA (US);
Jun Qian, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 413 days.

(21) Appl. No.: 17/524,157

(22) Filed: Nov. 11, 2021

(65) Prior Publication Data
US 2023/0146501 A1    May 11, 2023

(51) Int. Cl.
*G06V 30/41*    (2022.01)
*G06N 20/00*    (2019.01)
*G06V 30/18*    (2022.01)

(52) U.S. Cl.
CPC ........... *G06V 30/41* (2022.01); *G06N 20/00* (2019.01); *G06V 30/18181* (2022.01)

(58) Field of Classification Search
None
See application file for complete search history.

(56) References Cited

U.S. PATENT DOCUMENTS

| | | |
|---|---|---|
| 9,424,668 B1 | 8/2016 | Petrou et al. |
| 11,087,081 B1 | 8/2021 | Srivastava et al. |
| 11,341,367 B1 | 5/2022 | Barbosa et al. |

(Continued)

FOREIGN PATENT DOCUMENTS

| | | |
|---|---|---|
| CN | 107977345 A | 5/2018 |
| CN | 113936340 A | 1/2022 |

(Continued)

OTHER PUBLICATIONS

"Augmentation Pipeline for Rendering Synthetic Paper Printing, Faxing, Scanning and Copy Machine Processes", Available Online at: https://github.com/sparkfish/augraphy, Accessed from Internet on Apr. 4, 2022, pp. 1-13.

(Continued)

*Primary Examiner* — Dov Popovici
(74) *Attorney, Agent, or Firm* — Kilpatrick Townsend & Stockton LLP

(57) ABSTRACT

A computing device may receive a set of user documents. Data may be extracted from the documents to generate a first graph data structure with one or more initial graphs containing key-value pairs. A model may be trained on the first graph data structure to classify the pairs. Until a set of evaluation metrics for the model exceeds a set of deployment thresholds: generating, a set of evaluation metrics may be generated for the model. The set of evaluation metrics may be compared to the set of deployment thresholds. In response to a determination that the set of evaluation metrics are below the set of deployment thresholds: one or more new graphs may be generated from the one or more initial graphs in the first graph data structure to produce a second graph data structure. The first and second graph can be used to train the model.

20 Claims, 15 Drawing Sheets

(56) References Cited

U.S. PATENT DOCUMENTS

| | | | | |
|---|---|---|---|---|
| 2012/0062574 | A1* | 3/2012 | Dhoolia | G06V 30/422 345/506 |
| 2020/0125954 | A1 | 4/2020 | Truong et al. | |
| 2020/0410231 | A1 | 12/2020 | Chua et al. | |
| 2021/0133645 | A1 | 5/2021 | Tazi et al. | |
| 2021/0158093 | A1 | 5/2021 | Kaynig-Fittkau et al. | |
| 2022/0092267 | A1 | 3/2022 | Hou et al. | |
| 2022/0171938 | A1 | 6/2022 | Jalaluddin et al. | |
| 2023/0146501 | A1 | 5/2023 | Agarwal et al. | |
| 2023/0326224 | A1* | 10/2023 | Agarwal | G06V 30/414 |

FOREIGN PATENT DOCUMENTS

| | | |
|---|---|---|
| CN | 114491010 A | 5/2022 |
| WO | 2022078922 A1 | 4/2022 |

OTHER PUBLICATIONS

"BERT", Available Online at: https://huggingface.co/docs/transformers/model_doc/bert, Accessed from Internet on Mar. 2, 2022, 114 pages.

"DataGen—CeDar", Centre for Applied Data Analytics Research, Available Online at: https://old.ceadar.ie/wp-content/uploads/CeADAR_Flyer_DataGen_v2.pdf, 1 page.

"Datagen Synthetic Image Datasets for Computer Vision", Available Online at: https://datagen.tech/, Accessed from Internet on Jun. 1, 2022, pp. 1-6.

"Deterministic Algorithm", Wikipedia, Available Online at: https://en.wikipedia.org/wiki/Deterministic_algorithm, Accessed from Internet on Mar. 2, 2022, 4 pages.

"DistilBERT", Available Online at: https://huggingface.co/docs/transformers/model_doc/distilbert, Accessed from Internet on Mar. 2, 2022, 62 pages.

"Scipy.Optimize.Linear_Sum_Assignment", Available Online at: https://docs.scipy.org/doc/scipy-0.18.1/reference/generated/scipy.optimize.linear_sum_assignment.html, Sep. 19, 2016, 2 pages.

"Sklearn.Decomposition.PCA", Available Online at: https://scikit-learn.org/stable/modules/generated/sklearn.decomposition.PCA.html, Accessed from Internet on Mar. 2, 2022, 6 pages.

"Spaczz: Fuzzy Matching and More for Spacy", Available Online at: https://github.com/gandersen101/spaczz, Accessed from Internet on Mar. 2, 2022, 20 pages.

"Text Distance", Available Online at: https://github.com/life4/textdistance, Accessed from Internet on Mar. 2, 2022, 9 pages.

"Welcome to Albumentations Documentation", Available Online at: https://albumentations.ai/docs/, Accessed from Internet on Apr. 4, 2022, pp. 1-3.

"WordNet: A Lexical Database for English", Princeton University, Available Online at: https://wordnet.princeton.edu/, Accessed from Internet on Mar. 2, 2022, 4 pages.

U.S. Appl. No. 17/714,806, "Notice of Allowance", dated Jun. 22, 2023, 14 pages.

Abdelzad et al., "Detecting Out-of-Distribution Inputs in Deep Neural Networks Using an Early-Layer Output", Available Online at: https://arxiv.org/pdf/1910.10307.pdf, Oct. 23, 2019, 15 pages.

Ba, "Meta-data Driven Key-Value Pairs Extraction with Azure Form Recognizer", Available Online at: https://techcommunity.microsoft.com/t5/ai-cognitive-services-blog/meta-data-driven-key-value-pairs-extraction-with-azure-form/ba-p/1942595, Nov. 30, 2020, 8 pages.

Biswas et al., "DocSynth: A Layout Guided Approach for Controllable Document Image Synthesis", Available Online at: https://arxiv.org/pdf/2107.02638.pdf, Jul. 6, 2021, pp. 1-15.

Brems, "A One-Stop Shop for Principal Component Analysis", Towards Data Science, Available Online at: https://towardsdatascience.com/a-one-stop-shop-for-principal-component-analysis-5582fb7e0a9c, Apr. 18, 2017, 14 pages.

Chogovadze et al., "Controllable Data Augmentation Through Deep Relighting", Available Online at: https://arxiv.org/pdf/2110.13996.pdf, Oct. 26, 2021, pp. 1-15.

Delalandre et al., "Generation of Synthetic Documents for Performance Evaluation of Symbol Recognition & Spotting Systems.", International Journal on Document Analysis and Recognition, vol. 13, No. 3, Sep. 2010, pp. 187-207.

Gautam, "Form Data Augmentation: Repository for Augmenting Data in Forms, Invoices and Receipts for Document Image Understanding", Available Online at: https://github.com/gautam-aayush/form-data-augmentation, Mar. 19, 2021, pp. 1-11.

Ghosh, "Invoice Information Extraction Using OCR and Deep Learning", Available Online at: https://medium.com/analytics-vidhya/invoice-information-extraction-using-ocr-and-deep-learning-b79464f54d69, Jan. 14, 2021, 31 pages.

Huang et al., "Out-of-Distribution Detection for LiDAR-based 3D Object Detection", Available Online at: https://arxiv.org/pdf/2209.14435v1.pdf, Sep. 28, 2022, 7 pages.

Jaadi, "A Step-by-Step Explanation of Principal Component Analysis (PCA)", Builtin.com, Available Online at: https://builtin.com/data-science/step-step-explanation-principal-component-analysis, Apr. 1, 2021, 8 pages.

Journet et al., "DocCreator: A New Software for Creating Synthetic Ground-Truthed Document Images", Journal of Imaging, vol. 3, Available Online at: https://hal.archives-ouvertes.fr/hal-01668915/file/jimaging.pdf, Dec. 2017, pp. 1-17.

Lin et al., "An Efficient Data Augmentation Network for Out-of-Distribution Image Detection", IEEE Access, vol. 9, Feb. 24, 2021, pp. 35313-35323.

Luan et al., "Out-Of-Distribution Detection for Deep Neural Networks with Isolation Forest and Local Outlier Factor", Available Online at: https://www.researchgate.net/publication/354189192_Out-Of-Distribution_Detection_for_Deep_Neural_Networks_with_Isolation_Forest_and_Local_Outlier_Factor, Aug. 27, 2021, 13 pages.

Ma, "nlpaug: Data AugmentatioSUNn for NLP", Available Online at: https://github.com/makcedward/nlpaug, Accessed from Internet on Apr. 4, 2022, 21 pages.

Moore et al., "Hungarian Maximum Matching Algorithm", Brilliant Math & Science Wiki, Available Online at: https://brilliant.org/wiki/hungarian-matching/, Accessed from Internet on Mar. 2, 2022, 7 pages.

Moore et al., "Matching (Graph Theory)", Brilliant Math & Science Wiki, Available Online at: https://brilliant.org/wiki/matching/, Accessed from Internet on Mar. 2, 2022, 6 pages.

Moore et al., "Matching Algorithms (Graph Theory)", Brilliant Math & Science Wiki, Available Online at: https://brilliant.org/wiki/matching-algorithms/, Accessed from Internet on Mar. 2, 2022, 5 pages.

Rawat et al., "PnPOOD : Out-Of-Distribution Detection for Text Classification via Plug and Play Data Augmentation", Available Online at: https://arxiv.org/abs/2111.00506, Oct. 31, 2021, 9 pages.

Ronneberger et al., "U-Net: Convolutional Networks for Biomedical Image Segmentation", International Conference on Medical Image Computing and Computer-Assisted Intervention, Available Online at URL: https://arxiv.org/pdf/1505.04597.pdf, May 18, 2015, pp. 234-241.

Sebastianelli et al., "Automatic Dataset Builder for Machine Learning Applications to Satellite Imagery", Software X, vol. 15, Jul. 2021, 7 pages.

Van Laer, "Recognition of Named Entities on Invoices for IxorDocs", Available Online at: https://medium.com/ixorthink/recognition-of-named-entities-on-invoices-for-ixordocs-9bef38d24429, Aug. 2, 2018, 14 pages.

Veyseh et al., "Improving Keyphrase Extraction with Data Augmentation and Information Filtering", Available Online at: https://www.researchgate.net/publication/363501653_Improving_Keyphrase_Extraction_with_Data_Augmentation_and_Information_Filtering, Sep. 11, 2022, 10 pages.

White, "By 2024, 60% of the Data Used for the Development of AI and Analytics Projects Will Be Synthetically Generated", Available Online at: https://blogs.gartner.com/andrew_white/2021/07/24/by-2024-60-of-the-data-used-for-the-development-of-ai-and-analytics-projects-will-be-synthetically-generated/, Jul. 24, 2021, pp. 1-4.

Yu et al., "PICK: Processing Key Information Extraction from Documents using Improved Graph Learning-Convolutional Net-

(56) References Cited

OTHER PUBLICATIONS works", arXiv:2004.07464, Available Online at: https://arxiv.org/pdf/2004.07464.pdf, Jul. 18, 2020, 8 pages.

"LayoutLMFT", Available online at https://github.com/microsoft/unilm/tree/master/layoutlmft, Accessed from Internet on Aug. 19, 2021, 2 pages.

"Public Leader for SROIE", Available online at https://rrc.cvc.uab.es/?ch=13&com=evaluation&task=3, Accessed from Internet on: Aug. 19, 2021, 5 pages.

Devlin et al., "BERT: Pre-training of Deep Bidirectional Transformers for Language Understanding", Available Online at: https://arxiv.org/pdf/1810.04805.pdf, May 24, 2019, 16 pages.

Liu et al., "Self-Supervised Learning: Generative or Contrastive", Available online at https://arxiv.org/pdf/2006.08218.pdf, Mar. 20, 2021, pp. 1-24.

Ma, "NLP Augmentation", Available online at: https://github.com/makcedward/nlpaug, 2019, 4 pages.

Sun et al., "Spatial Dual-Modality Graph Reasoning for Key Information Extraction", Journal of Latex Class Files, vol. 14, No. 8, Available online at https://arxiv.org/pdf/2103.14470.pdf, Aug. 2015, pp. 1-9.

Xu et al., "LayoutLM: Pre-Training of Text and Layout for Document Image Understanding", Available Online at: https://arxiv.org/pdf/1912.13318.pdf, Aug. 23-27, 2020, 9 pages.

You et al., "Graph Contrastive Learning with Augmentations", 34th Conference on Neural Information Processing Systems, Available online at https://papers.nips.cc/paper/2020/file/3fe230348e9a12c13120749e3f9fa4cd-Paper.pdf, 2020, pp. 1-12.

\* cited by examiner

TECHNIQUES FOR GRAPH DATA STRUCTURE AUGMENTATION

BACKGROUND

Machine learning models can be trained to identify key-value pairs in a document using graph data structure. For example, relationships between molecules can be identified using such a model. However, training a machine learning model on a graph data structure can produce an overfitted model if the graph data structure contained an insufficient number of graphs. Thus, challenges exist in training a machine learning model on a graph data structure.

BRIEF SUMMARY

Techniques are provided for training a machine learning model on an augmented graph data structure.

In an embodiment, a set of user documents can be received at a computer device. data can be extracted from the set of user documents by the computer device. A first graph data structure can be generated by the computing device. The graph data structure can contain one or more initial graphs containing the data extracted from the user document. The data can include a set of key-value pairs. The model can be trained on the first graph data structure to classify the set of key-value pairs. The model can be trained by the computing device. Until a set of evaluation metrics for the model exceeds a set of deployment thresholds: generating the set of evaluation metrics for the model. The evaluation metrics can be generated by the computing device. The set of evaluation metrics for the model can be compared to the set of deployment thresholds. The evaluation metrics and deployment thresholds can be compared by the computing device. In response to a determination that the set of evaluation metrics are below the set of deployment thresholds: generating one or more new graphs to produce a second graph data structure. The one or more new graphs can be generated by a first augmentation module of the computing device. The one or more new graphs can be generated from the one or more initial graphs in the first graph data structure. The model can be trained on at least one of the first graph data structure and the second graph data structure by the computing device.

In one general aspect, generating the one or more new graphs to produce the second graph data structure further comprises: receiving the one or more initial graphs from the first graph data structure. The one or more initial graphs can be received by the first augmentation module of the computing device. One or more edges and nodes in the one or more graphs of the one or more initial graphs can be deleted to produce one or more new graphs. The one or more edges and nodes can be deleted by the first augmentation module of the computing device. The one or more new graphs can be stored in the first graph data structure to produce the second graph data structure. The one or more new graphs can be stored by the first augmentation module of the computing device.

In one general aspect, deleting one or more edges and nodes further comprises: determining an occurrence metric. The occurrence metric can comprise a frequency distribution of a set of node labels. The occurrence metric can be determined by the computing device. An importance metric can be determined by a computing device. The importance metric can comprise a weight for the set of node labels. A proximity metric can be determined by the computing device. One or more edge and nodes can be deleted by the computing device. The one or more edges and nodes can be deleted based at least in part on one or more of the occurrence metric, the importance metric, or the proximity metric.

In one general aspect, the method further comprises: until a set of robustness metrics for the model exceeds a set of robustness thresholds: generating the set of robustness metrics for the model. The set of robustness metrics can be generated by the computing device. The set of robustness metrics can be compared to the set of robustness thresholds by the computing device. In response to a determination that the set of robustness metrics are below a set of robustness thresholds: altering key-value pairs in the second graph data structure to produce a third graph data structure. The key-value pairs can be altered by the second augmentation module of the computing device. Training the model on at least one of the first graph data structure, the second graph data structure, or the third graph data structure to classify key-value pairs. The model can be trained by the computing device.

In one general aspect, altering the key-value pairs further comprises: changing a sequence of words in one or more key-value pairs in the second graph data structure. The sequence of words can be changed by the second augmentation module of the computing device. A spelling of one or more words in one or more key-value pairs can be changed in at least one of the first graph data structure or the second graph data structure. The spelling can be changed by the second augmentation module of the computing device.

In one general aspect, the user documents can include at least one of: drivers licenses, gun licenses, passports or checks.

In one general aspect, the data can be extracted from the user documents using optical character recognition (OCR).

One general aspect includes one or more non-transitory computer-readable storage media that may include computer-executable instructions that, when executed by one or more processors of a computing device, cause the computing device to perform instructions comprising: receiving a set of user documents. The instructions include extracting data from the set of user documents. The instructions include generating a first graph data structure with one or more initial graphs containing the data extracted from the user document. The data can include a set of key-value pairs. The instructions include training a model on the first graph data structure to classify the set of key-value pairs. The instructions include until a set of evaluation metrics for the model exceeds a set of deployment thresholds: generating the set of evaluation metrics for the model. The instructions include comparing the set of evaluation metrics to the set of deployment thresholds. The instructions include in response to a determination that the set of evaluation metrics are below the set of deployment thresholds: generating one or more new graphs from the one or more initial graphs in the first graph data structure to produce a second graph data structure. The one or more new graphs can be generated by a first augmentation module of the computing device. The instructions include training the model on at least one of the first graph data structure and the second graph data structure.

One general aspect includes, a system comprising: a memory storing computer-executable instructions and one or more processors configured to access the memory, and execute the computer-executable instructions to at least: receive a set of user documents. The system is also configured to extract data from the set of user documents. The system is also configured to generate a first graph data structure with one or more initial graphs containing the data extracted from the user document, the data including a set of key-value pairs. The system is also configured to train a model on the first graph data structure to classify the set of key-value pairs. The system is also configured to, until a set of evaluation metrics for the model exceeds a set of deployment thresholds: generate the set of evaluation metrics for the model. The system is also configured to compare the set of evaluation metrics to the set of deployment thresholds. The system is also configured to, in response to a determination that the set of evaluation metrics are below the set of deployment thresholds: generate one or more new graphs from the one or more initial graphs in the first graph data structure to produce a second graph data structure. The one or more new graphs can be generated by a first augmentation module of a computing device. The system is also configured to train the model on the second graph data structure.

DETAILED DESCRIPTION

Figure 1:
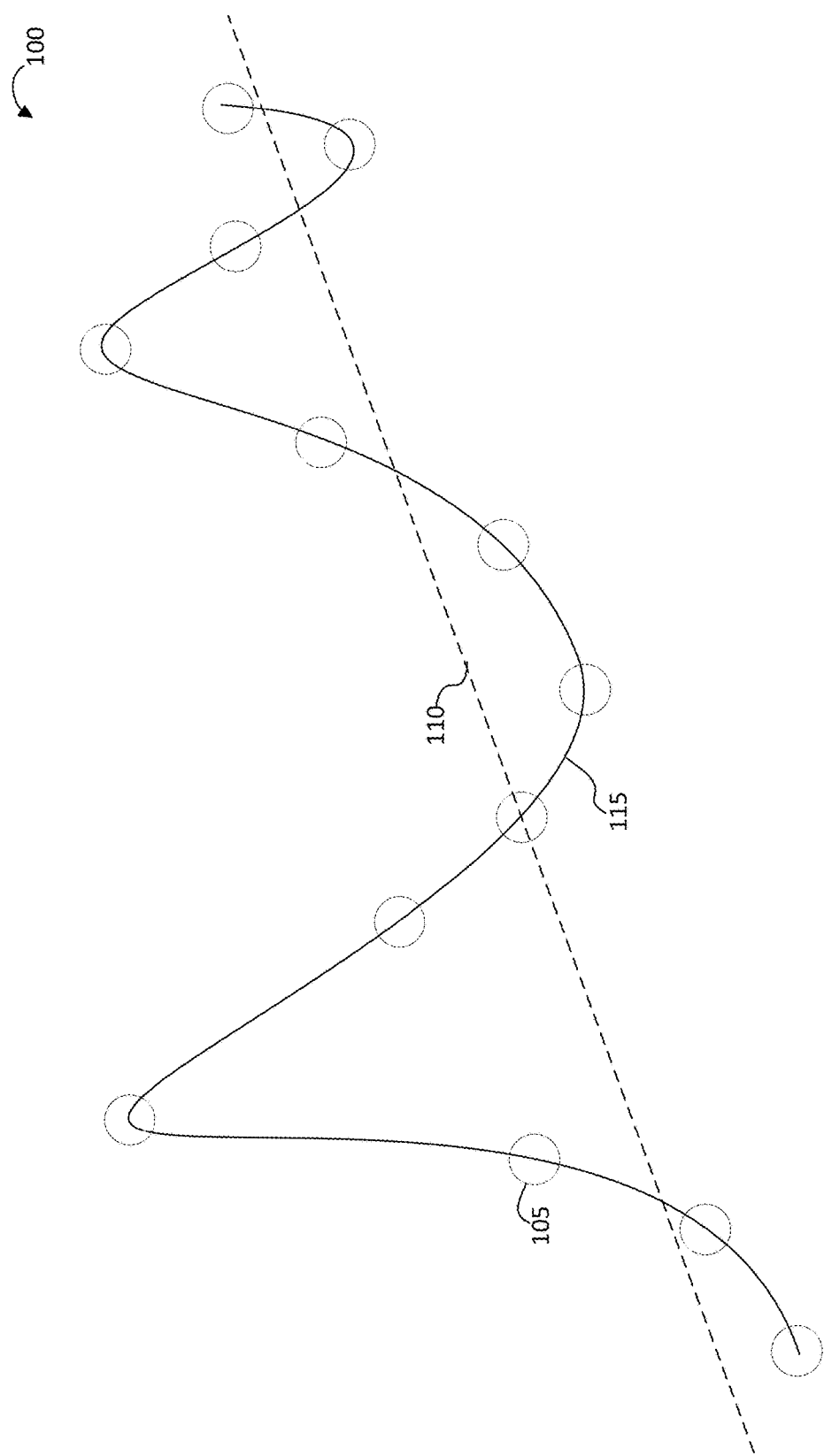
FIG. 1 shows a graph of an overfit polynomial model.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for augmenting a graph data structure used to train a graph neural network (GNN) model. A graph data structure can comprise a series of edges, or connections, showing relationships between data points called nodes. Graph neural networks are useful for classifying nodes in complex systems with large amounts of data. For instance, graph neural networks are often used to describe social media networks or molecules.

Visually rich documents (e.g., user documents) can include documents where information is conveyed both by content and layout. For instance, understanding a birth date field in a license can require information conveyed by content (e.g., 01/01/1997) and layout (e.g., the content "01/01/1997" is proximate to a "DOB" field and not the "EXP" field of a document). Visually rich documents can include driver's licenses, passports, checks, gun licenses, etc. Data from visually rich documents can be described as key-value pairs (e.g., attribute-value pair or field-value pair). For instance a key from a driver's license can be "weight" and the value can be "142 lb."

A graph neural network (GNN) model can be used to classify text in visually rich documents. A visually rich document can be represented as a graph where the nodes comprise individual words. The nodes in the graphs can contain the word's layout information, visual features, and textual features. The textual features can be words extricated from the visually rich document using optical character recognition (OCR). The visual features can be the license's background, color, texture, font design or other pixel level information from the license image. The layout information can be the text's location on the license. A graph neural network trained on visually rich documents can predict whether a node is a key or a value. A graph neural network trained on visually rich documents can also predict which nodes are related.

While GNN models can learn the relationships between words in visually rich documents, training a GNN model can require a large set of training data. Visually rich documents often contain sensitive personal data and obtaining large amounts of visually rich documents can be challenging. Additionally, many sample visually rich documents are not ideal for training because the documents are altered to prevent misuse. For example, a government's sample driver's licenses, in contrast to a legitimate license, often state in large letters that the document is a sample.

If a GNN is trained on a small set of training data, the GNN can become overfit to the data. An overfitted model has become aligned too closely with a minimal set of data. The overfitted model can accurately classify the training data but the model struggles to classify new information. Traditionally, overfitting is prevented by using a large training set or by limiting training time so that the model cannot align too closely to the training data.

As proposed herein, overfitting by a GNN model can be mitigated by augmenting a small set of training data. Using domain statistics, a small sample of graphs (e.g., visually rich documents) can be augmented without altering the graph's class labels. Edges and nodes within a graph can be deleted to produce a new view (e.g., perturbed view) of the graph. The perturbed view of the graph is structurally different from the original graph but the graph's altered layout does not changes the meaning of existing key-value pairs within the graph. The GNN model can learn the original graphs (e.g., original views) and new graphs (e.g., perturbed views) with equal weight. By creating perturbed views, the GNN model can be trained on a small dataset without overfitting. The perturbed views can be efficient at reducing overfitting for GNN models. For example, a GNN model trained on 90 graphs can be overfit to the data. The initial 90 graphs can be augmented with 90 perturbed views for a total of 180 graphs. While 180 graphs can be considered a small dataset, the GNN model can be trained without overfitting on the 180 graphs.

A GNN model trained on an augmented training set can have better generalization and robustness in the model performance when compared to a model trained on the original un-augmented data. Generalization can refer to the ability of a model to classify data that was not contained in the training set. Robustness can refer to the ability of a model to accurately classify corrupt or erroneous data.

Robustness can be difficult to evaluate for key information extraction (KIE) from visually rich documents. Current techniques for evaluating key information extraction from visually rich documents are based on error-free text extraction and recognition. However, errors are common for text extraction using optical character recognition (OCR) from visually rich documents. A new robustness metric, proposed herein, can help to quantify the effect of OCR errors on the downstream application of key information extraction from visually rich documents. The robustness metric can include comparing a model's performance on a test data set with the model's performance on a modified data set. Simulated OCR errors can be introduced to the test data set to produce the modified data set. A comparison between a model's performance on the test data set and the modified data set can quantify the mode's robustness to OCR errors.

A GNN model can be trained to classify key-pairs using a training pipeline. A computing device can be used to generate graphs from visually rich documents. Perturbed views of the graphs are created with a first data augmentation module (e.g., data augmenter 1). The training data, including the perturbed views and original graphs, can be provided to a graph model trainer that produces a trained GNN model. The trained GNN can be evaluated on one or more evaluation metrics to produce an evaluation score (e.g., F1 score). Evaluating the trained GNN model can include using the model to classify key-value pairs in a set of test data. If the trained GNN's evaluation score does not exceed a threshold (e.g., deployment criteria) the training data can be passed through data augmenter 1 to produce more perturbed views. After more perturbed views are added to the training data, the GNN model can be retrained.

If the trained GNN's evaluation score exceeds the threshold, the robustness of the trained GNN can be evaluated using a robustness metric. Determining a robustness score for the robustness metric can include using the trained GNN to classify key-value pairs in a set of test data after errors are introduced into test data. The robustness metric can be a difference in score between the trained graph neural network model's performance on the test data without errors and the test data with errors. If a decrease in the trained GNN model's performance exceeds a threshold, model can be retrained. Before retraining, errors can be introduced into the training data using a second data augmentation module (data augmenter 2). The trained GNN model can be ready for deployment as a service if the model satisfies the evaluation metric and robustness metric.

In an illustrative example, a graph neural network (GNN) model is trained on a training set comprising 90 driver's licenses from a variety of states. The trained GNN model is intended as part of a bank's software. An employee can verify a customer's driver's license and can fill out an account application by photographing the customer's license. Other use cases for a trained GNN model can include searching a database for customer records using a photograph of the customer's license or verifying a license's validity by photographing the license. The 90 driver's licenses are used to generate graphs that are augmented with perturbed views using a first data augmenter. After training, the GNN model can classify the key-value pairs from a test set with a high degree of precision. The trained GNN model's precision is reflected in a high F1 score. A F1 score is a measure of precision and recall for binary classification and multi-class classification systems. F1 scores range from 1.0 to 0 with 1.0 indicating perfect recall and precision. Based on the GNN model's F1 score, the GNN model satisfies the evaluation metric.

However, the GNN model performs poorly on the robustness metric. In this case, the F1 score drops significantly when simulated optical character recognition (OCR) errors are introduced to the test data set at random. The trained GNN model fails the robustness metric because the decrease in F1 score exceeds a threshold. Based on the GNN's performance on the test set, the model is not suitable for its intended purpose and the model should be retrained.

Before retraining the training data is augmented using a second data augmenter. The second data augmentation module introduces simulated errors into the training data. The augmented data set still includes the 90 original drivers licenses and the perturbed views generated from those original licenses. However after augmentation, some of the words in the augmented data set are misspelled. The GNN model is trained on the augmented data set and satisfies both the evaluation metric and robustness metric. Accordingly, the augmented training set of 90 drivers licenses was sufficient to produce a GNN model.

FIG. 1 shows a graph 100 of an overfit polynomial model. The graph includes a plot of data points 105. The data points 105 are noisy but the data is roughly linear. The data points 105 have a slight positive correlation and the data points 105 can be described by line 110. An overfit model is shown by the polynomial 115. While polynomial 115 passes through every data point (e.g., data point 105), the polynomial 115 is too specific to the data points on the graph. Polynomial 115 perfectly describes the data points, but polynomial 115 also has captured the data's noise. Accordingly polynomial 115 is not likely useful for making future predictions on similar data. In contrast, line 110 does not perfectly describe the data points, but line 110 can likely be used to make predictions about related data.

Figure 2A:
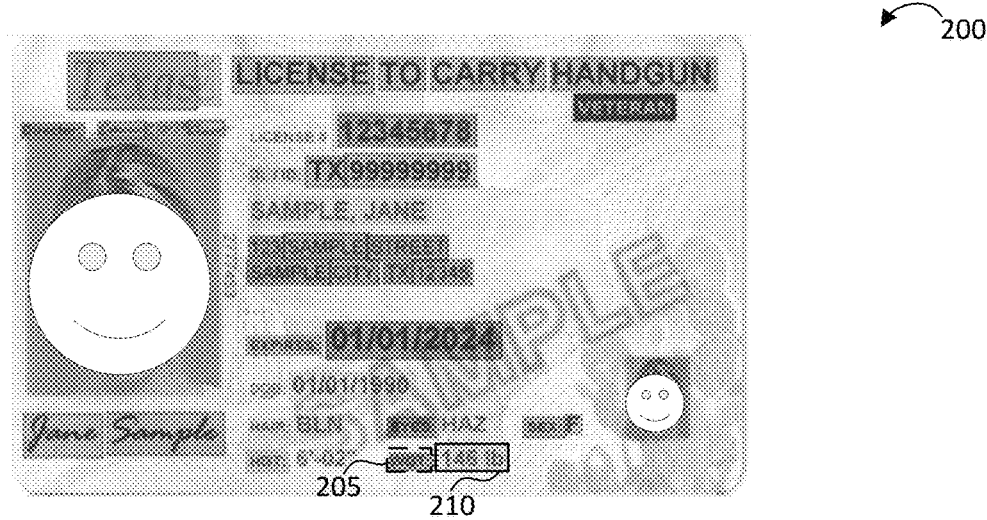
FIG. 2A is a visually rich document with a key-value pair according to an embodiment.

FIG. 2A is a visually rich document 200 with a key-value pair according to an embodiment. The visually rich document in this case is a Texas license to carry a handgun. The visually rich document includes key-value pairs. A key-value pair can include a key and one or more values associated with the key. The key defines the data set and values are a variable that belongs to the set.

In this case, WGT represents a WGT key 205 that defines the data set as containing one or more variables describing the license holder's weight. WGT key 205 is associated with a single WGT value 210 listing the weight as "146 lb." Key-value pairs convey a relationship between WGT key 205 and WGT value 210. WGT key 205 without an associated value is not likely to provide useful information. Alone WGT key 205 states that the license holder has a weight without defining the weight. Similarly, the value 210 lists a weight, 146 lb, without providing a meaning for that weight.

Figure 2B:
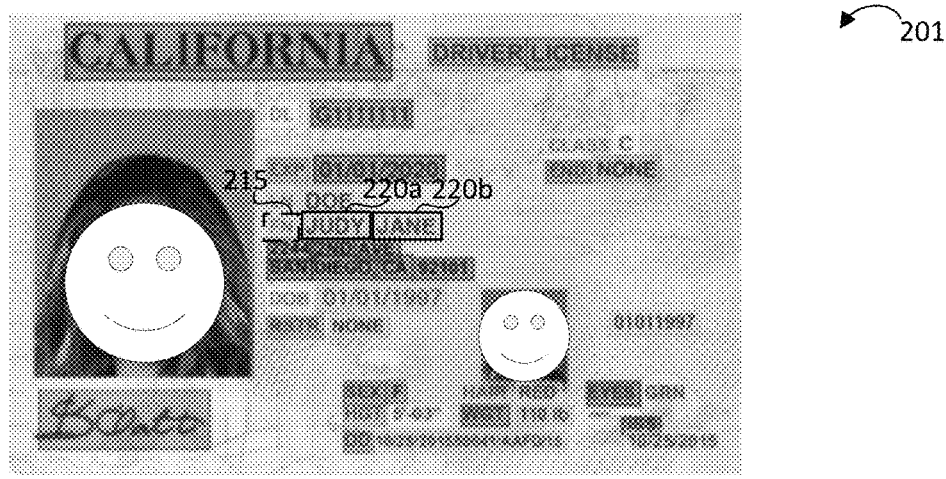
FIG. 2B shows a visually rich document with a key that is associated with two values according to an embodiment.

FIG. 2B shows a visually rich document 201 with a key that is associated with two values according to an embodiment. The visually rich document 201 is a driver's license. The key is "FN" and FN key 215 defines the data set as containing the license holder's first name. However, in this case the first name is two separate names and the license holder's first name is Judy Jane. The first FN value 220a is Judy and the second FN value 220b is Jane. A key-value pair is not limited to two values and a key-value pair can include as many values as are required by the data.

Figure 2C:
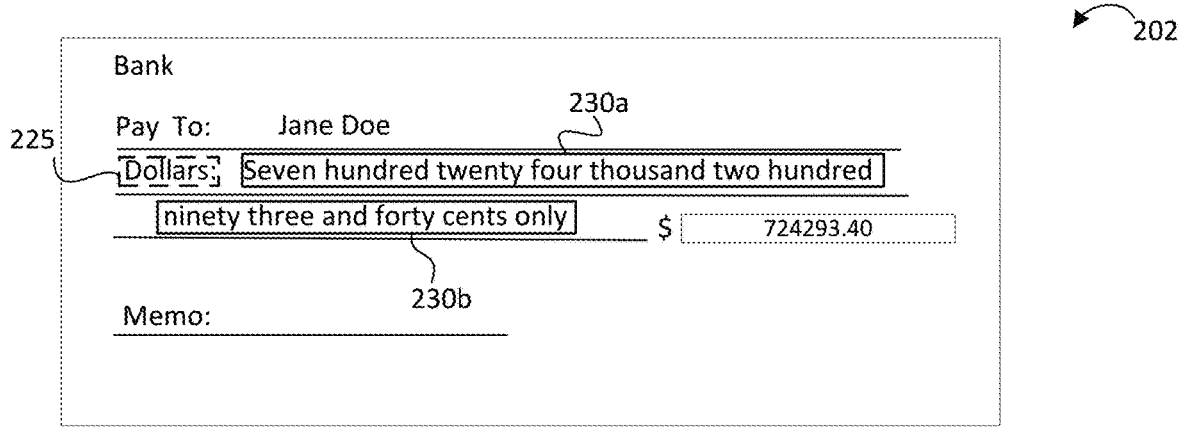
FIG. 2C shows a visually rich document with a single key associated with multiple values according to an embodiment.

FIG. 2C shows a visually rich document 202 with a single key associated with multiple values according to an embodiment. In this case, the visually rich document is a check. The key defines the data set as representing a dollars and the key is represented by dollar key 225. In this example, there are 14 values spread over two lines on the check. The values comprise the amount of dollars that the check authorizes the bank to transfer. The first line dollars values 230a is the first half of the amount of dollars and the second line dollars values 230b is the second half of the amount of dollars.

Visually rich document 202 shows how the layout of a visually rich document conveys information. The amount of money that the bank authorizes the check holder to withdraw depends on the order of values in the set of dollar values 230a-b. The check authorizes the transfer of "seven hundred twenty four thousand two hundred ninety three and forty cents" (e.g., ₹724293.40). If the order is rearranged, the amount of money authorized by the check can vary significantly from the intended amount.

Figure 3:
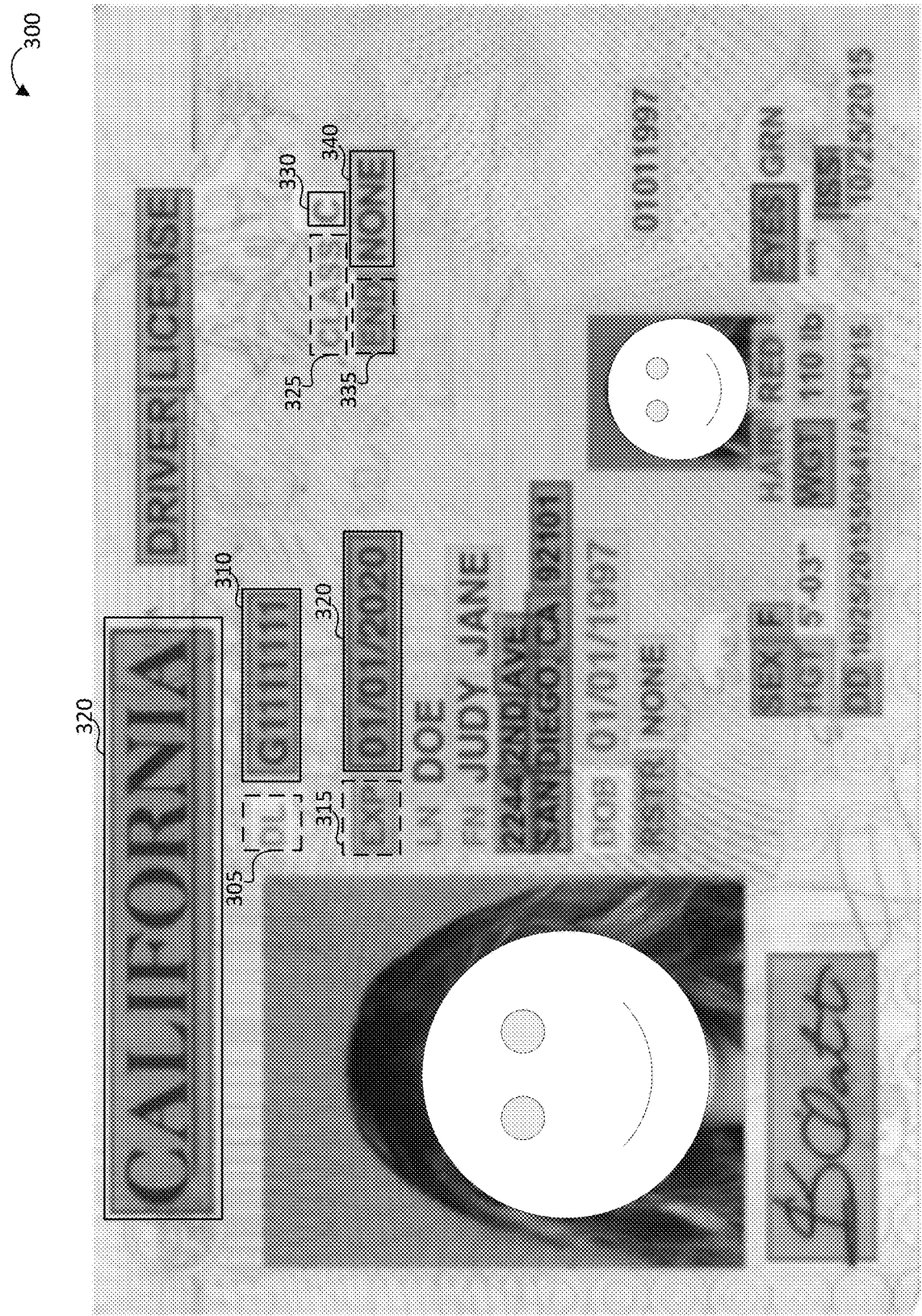
FIG. 3 shows a visually rich document with labeled key-value pairs according to an embodiment.

FIG. 3 shows a visually rich document 300 with labeled key-value pairs according to an embodiment. In this case, the visually rich document is a driver's license. DL 305 is a key that defines the associated value as containing a driver's license number. The DL value 310 contains the driver's license number "G1111111." EXP 315 is a key that corresponds with values containing the driver's license's expiration date. EXP value 320 is a value that contains the drivers license's expiration date "01/01/2020." CLASS 325 is a key representing the driver's license class and the CLASS value 330 for this license is "C." END 335 is a key that documents whether the license holder has any endorsements or additional driving privileges. In this case the END value 340 is "none" but a license holder could have, for example, a "M" as an END value 340 indicating the license holder is allowed to ride a motorcycle. In some circumstances, a value can be present in a visually rich document without an explicitly stated key. California is an example of a value without an explicitly stated key. The key associated with California can be a region key. If a visually rich document has a value without an explicitly stated key, the key can be predicted by the model based at least in part on the value's neighbors.

Figure 4A:
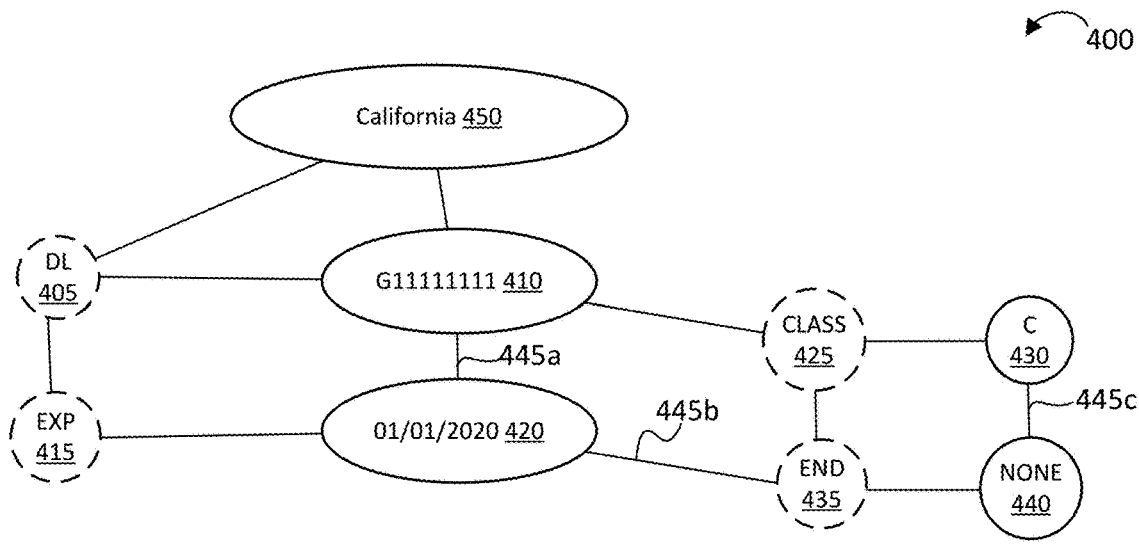
FIG. 4A shows a simplified graph generated from the visually rich document from FIG. 3 according to an embodiment.

FIG. 4A shows a simplified graph 400 generated from the visually rich document from FIG. 3 according to an embodiment. While a subset of the possible keys and values from visually rich document 300 are shown in simplified graph 400, a graph generated from visually rich document 300 could contain different configurations of the keys and values from visually rich document 300.

Figure 4B:
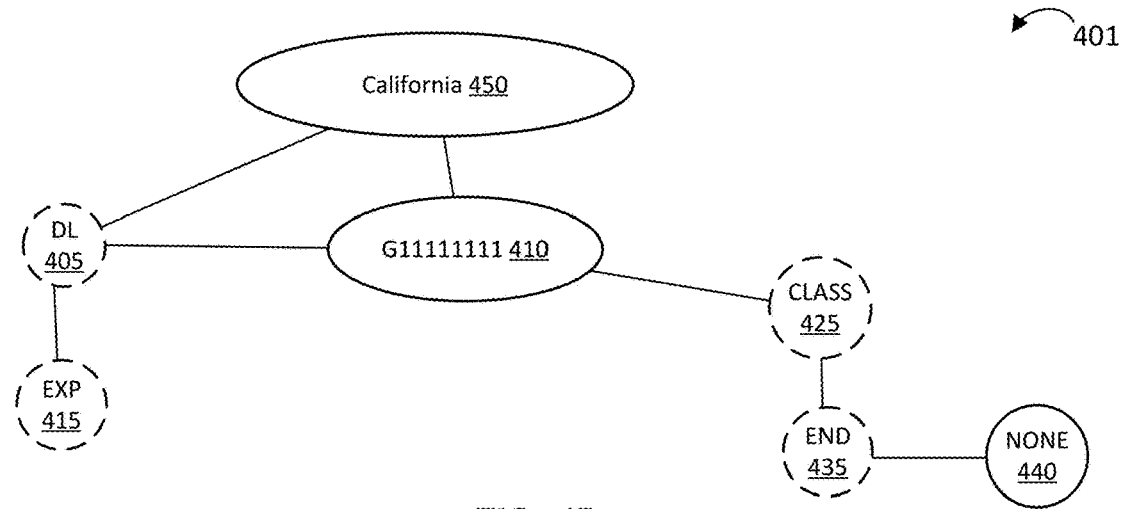
FIG. 4B shows a perturbed view of a simplified graph according to an embodiment.
Figure 4C:
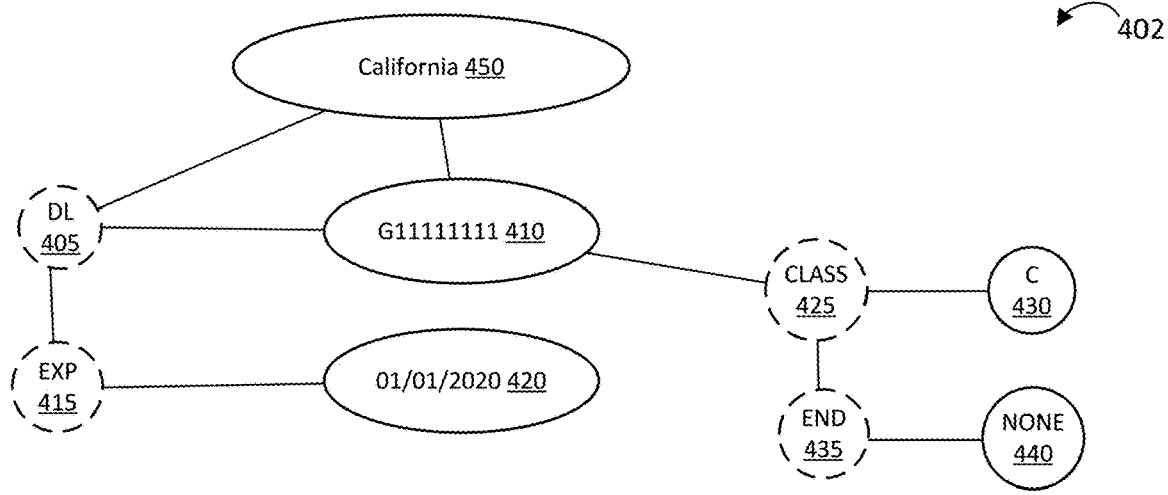
FIG. 4C shows a perturbed view of a simplified graph according to an embodiment.

Turning to FIG. 4A in greater detail, both keys and values are depicted as nodes in simplified graph 400. Keys are shown as dashed line circles while values are shown as solid line circles or ovals. Keys include DL 405, EXP 415, Class 425, and END 435. Values include DL value 410, EXP value 420, CLASS value 430, END value 435, and California 450. The keys and values described in relation to FIGS. 4A-4C are similar to related features described in relation to FIG. 3. Connections between the nodes, including both keys and values, are shown as lines between the nodes called edges 440a-c. In some implementations, edges can connect more nodes than depicted in simplified graph 400.

FIG. 4B shows a perturbed view 401 of simplified graph 400 according to an embodiment. Perturbed view 401 is generated by deleting nodes from simplified graph 400. In this case two value nodes, EXP value 420 and CLASS value 425, are deleted to create a perturbed view. However, in some implementations key nodes or a mix of key nodes and value nodes can be deleted to create a perturbed view. The deleted nodes can be selected using domain statistics.

FIG. 4C shows a perturbed view 402 of simplified graph 400 according to an embodiment. Perturbed view 402 is generated by deleting edges from simplified graph 400. In this case three edges 445a-c have been deleted. Two of the edges, 445a and 445c, are edges connecting two different value nodes. Edge 445b is an edge connecting a key node (e.g., END 435) and a value node (e.g., EXP value 420), but the key node and value node do not constitute a key-value pair. In some implementations, edges connecting a key-value pair can be deleted. Deleting edges connecting a key-value pair can allow the GNN model to learn the neighbors for a value.

Figure 5:
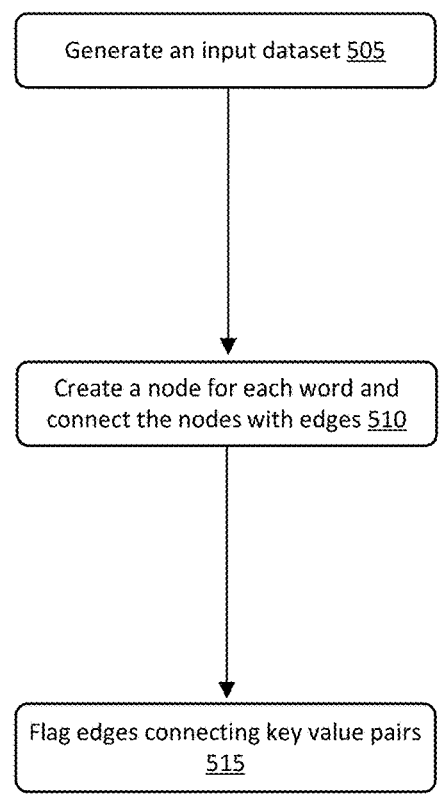
FIG. 5 depicts a process for generating a graph from a visually rich document according to an embodiment.

FIG. 5 depicts a process 500 for generating a graph from a visually rich document according to an embodiment. This process, in addition to the processes from FIGS. 6, 8 and 9 and the method from FIG. 10, are illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to process 500 in greater detail, at block 505, an input dataset can be generated. The input dataset can be generated from a visually rich document. The visually rich document can be an image-based document. The input dataset can include one or more of a set of identified words, a class label for the identified words, spatial location information, or a number of key-value pairs. The identified words can be detected using optical character recognition (OCR). The identified words can be typewritten text, handwritten block text, or handwritten cursive text. The identified words can be labeled with a class label of a key-value pair by a human annotator. The spatial location information can include a coordinate location (e.g., pixel coordinates) of the identified words. The spatial location information can include the spatial location for a bounding box surrounding the identified words. The number of key value pairs can be a minimum number of key-value pairs that a model should learn for classification.

At block 510, a node is created for the identified words. The identified words can include words, numbers, dates, identification numbers, etc. The nodes can be connected with edges. The edges can be initialized with distance information. The distance information can be determined from the spatial location for the identified words in the nodes. For instance, the distance information can be a distance (e.g., a number of pixels or Euclidian distance) from a centroid of the bounding boxes for the node's identified words. The edges can also store a height to width ratio for the bounding boxes.

At block 515, the edges connecting key-value pairs can be flagged. The key-value pairs can be assigned a relative importance. The relative importance can be a ranking of the key-value pairs or an importance weight that is assigned to the key-value pairs. For example, a driver's license number key-value pair can be more important than a weight key-value pair. The flagged edges can store the relative importance of the key-value pair connected by the edges.

Figure 6:
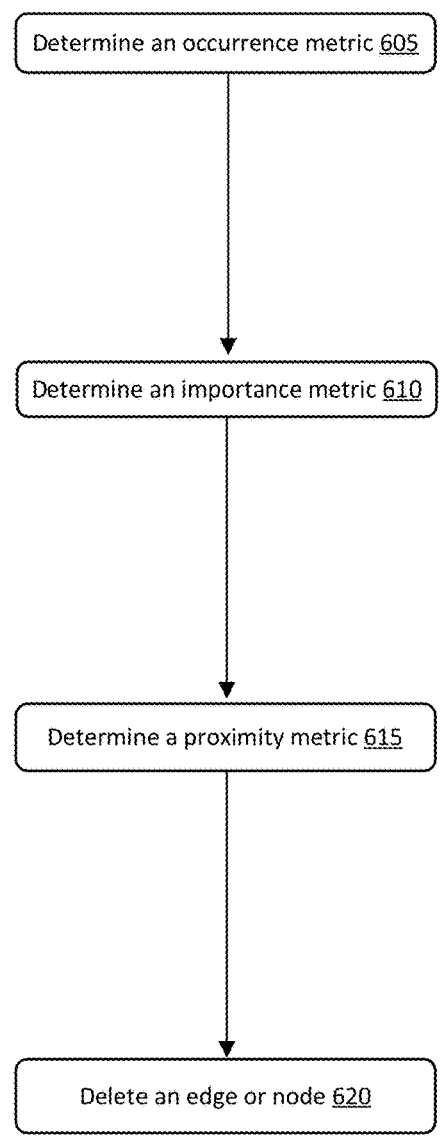
FIG. 6 shows a process for generating a perturbed view from a graph according to an embodiment.

FIG. 6 shows a process 600 for generating a perturbed view from a graph according to an embodiment. Process 600 can be used to generate structurally different graphs (e.g., perturbed views) for the same visually rich document. The perturbed views can be generated using domain statistics. The first data augmentation module (e.g., data augmenter 1; first augmentation module) can produce a second graph data structure from a first data structure using the process disclosed in FIG. 6.

Turning to process 600 in greater detail, at block 605, an occurrence metric can be determined. The occurrence metric can be a frequency distribution of labels (e.g., semantic classes) for node classification. The occurrence metric can be based at least in part on statistics. In some circumstances, the occurrence metric can be based at least in part on domain statistics. The domain can be the type of visually rich document, and, for example, checks, passports, and drivers licenses can be domains. Accordingly, the occurrence metric can be scalable and adaptive to different domains. The occurrence metric can be the count of words for each label in the dataset for the key.

At block 610, an importance metric can be determined. The importance metric can be a weight for each label or semantic class. The weight can be the importance of information in the domain associated with the label. For instance, the weight for the key "last name" can indicate a higher importance than the weight for the key "class." The importance metric can be based at least in part on statistics, and, in particular, the importance metric can be based on domain statistics.

At block 615, a proximity metric is determined. The proximity metric can be the "n" nearest neighbor for each label or semantic class in the dataset. The proximity metric can indicate the graphs density. The graph's density can be a ratio of how many connections exist in the graph to the amount of possible connections that can exist in the graph. The proximity metric can be the proximity and affinity between nodes. For example, if the WGT key and HEIGHT key can occur near each other in 90% of licenses. The proximity metric can be based at least in part on statistics, and, in particular, the proximity metric can be based on domain statistics.

At block 620, an edge or node can be deleted to create a perturbed view of the graph. In some circumstances, more than one edge or node can be deleted. When a node is deleted, the associated edges can be deleted as well. The edges or nodes can be assigned a deletion probability using at least one of the occurrence metric, the importance metric, or the proximity metric. Nodes with a high occurrence metric can be assigned a higher probability for deletion than nodes with an average occurrence metric. Nodes with a low occurrence metric can be assigned a higher deletion probability than nodes with an average occurrence metric. The deletion probability for nodes can be based at least in part on the importance metric. A node with a weight indicating a higher importance can be less likely to be deleted when compared to a node with a weight indicating a lower importance. The proximity metric can be used to assign a deletion probability to edges. The deletion probability for edges can increase as the frequency of edges between labels increases. Edges can be deleted to reduce proximity dependence between nodes. Edges can also be deleted to reduce the graph's density.

Current evaluation techniques for key-value extraction models often assume error-free text extraction. However, optical character recognition (OCR) errors can occur during text extraction. It can be difficult to distinguish whether the key-value extraction model received a poor evaluation score because the OCR model is error prone or if the poor score is due to the key-value extraction model's performance. A robustness metric, described herein, can address the OCR model's influence on the key-value extraction model's performance by quantifying the effect of input errors on the key-value extraction model's evaluation score.

The robustness metric can include word-order metrics. Models can learn the sequence of words in a document. To evaluate a model's robustness, the order of words in a test visually rich document can be rearranged when the document is fed to the key-value extraction model. The words can retain the words' spatial location in the visually rich document. The model can then classify the words into key-value pairs. The classified key-value pairs can be used to calculate an evaluation score (e.g., F1 score).

The robustness metric can also include character-reorder metrics. Models can become overfit to the character order in words. To evaluate the model's robustness to character order errors, the characters in a test visually rich document can be reordered to replicate common input errors. The characters can be reordered to replicate spelling errors, keyboard errors, OCR errors, or character jumbling. The key-value extraction model can classify the words from the test document into key-value pairs. The classified key-value pairs can be used to calculate an evaluation score (e.g., F1 score).

Figure 7:
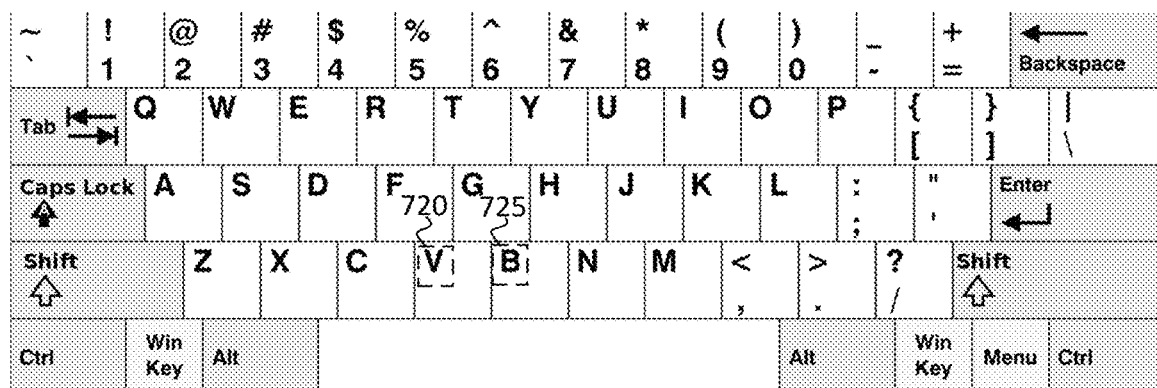
FIG. 7A shows an example of a spelling error according to an embodiment.
FIG. 7B shows an example of a keyboard error according to an embodiment.
FIG. 7C shows an example of an optical character recognition (OCR) error according to an embodiment.
FIG. 7D shows an example of a character jumbling error according to an embodiment.

FIG. 7A shows an example of a spelling error 700 according to an embodiment. The intended sentence 705*a* is "this is very COOL." The input sentence 710*a* contains a misspelled word 715*a*. Instead of "this" the misspelled word 715 was input as "thes."

FIG. 7B shows an example of a keyboard error 701 according to an embodiment. A keyboard error can be a specific type of spelling error. Keyboard errors can be caused because a key on an keyboard was mistakenly entered. For example, the intended sentence 705*b* again is "this is very COOL." The input sentence 710*b* contains the misspelled word 715*b*. Instead of "very," misspelled word 715*b* was input as "bery." The typing mistake can be attributed to the proximity of the V key 720 and the B key 725. During input the user likely intended to hit the V key 720 and instead the user accidentally hit the B key 725.

FIG. 7C shows an example of an optical character recognition (OCR) error 702 according to an embodiment. OCR errors can occur when an OCR model mistakenly identifies a character as a different incorrect character. Common OCR errors can include recognizing a 2 as a z, recognizing a Z or E as a B, or recognizing the numeral 1 as the lower case letter 1. In this case, the input sentence 705c is again "this is very COOL." The OCR model mistakenly identified a letter in the input sentence 710c. Instead of the word "COOL," the OCR model detected the misspelled word 715c as "COOL." The can result from the OCR model detecting the upper case letter O as the numeral 0.

FIG. 7D shows an example of a character jumbling error 703 according to an embodiment. In a character jumbling error, the misspelled word 715d from the input sentence 710d can contain the proper characters for the word from the intended sentence 705d. in this case the intended word can be "COOL" and the misspelled word 715d can be "LOCO." Misspelled word 715d can contain the proper characters however the error can result from an incorrect character order.

Figure 8:
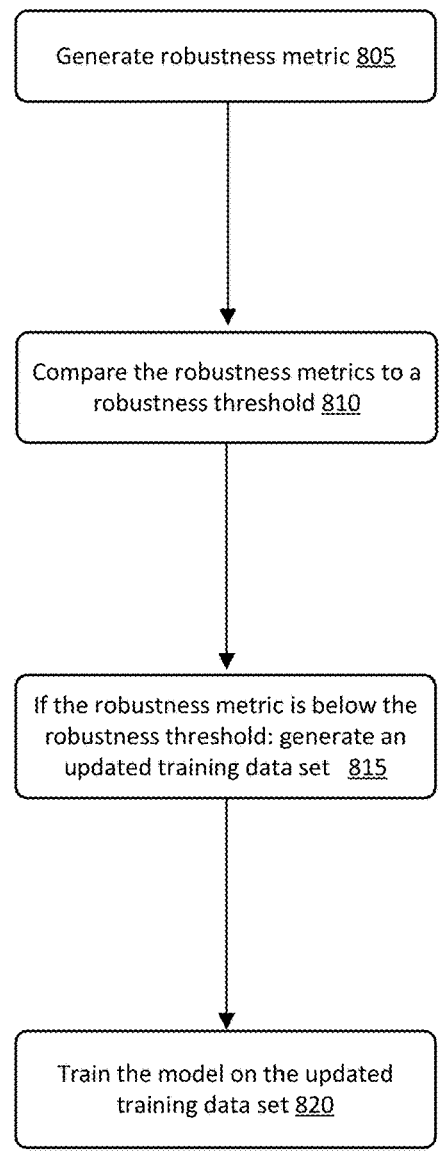
FIG. 8 shows a process for data augmentation and training according to an embodiment.

FIG. 8 is a process 800 for training a model to satisfy a set of robustness metrics. The model can be trained on a training data set that is augmented with introduced errors. The training data set can be augmented using a data augmenter (e.g., data augmenter 2).

Turning to process 800 in further detail, at block 805, a robustness metric can be generated for a graph neural network (GNN) model. The robustness metric can include a comparison between one or more evaluation scores. The evaluation scores can include a F1 score. A first evaluation score can be generated from the GNN model's performance on a first test data set that does not contain errors. A second evaluation score can be generated from the GNN model's performance on a second test data set. The second test data set can be produced by introducing errors into the first test data set. In some circumstances, generating the robustness metric can include comparisons between the first evaluation score and more than one additional evaluation score.

Errors can include word order errors. Models can learn the order of words in a document. A word order error can be introduced by shuffling the sequence of words in a visually rich document. The words can retain the information of their spatial location in the visually rich document. Errors can also include the errors discussed above in relation to FIG. 7 including spelling errors, keyboard errors, OCR errors, and character jumbling errors.

At block 810, the robustness metric can be compared to a robustness threshold. The robustness threshold can be an acceptable second evaluation score relative to the first evaluation score. For example, a second evaluation score can exceed the robustness threshold if the second evaluation score is 80% or more of the first evaluation score. The robustness metric can depend on the intended use case for the trained GNN model.

At block 815, an updated training data set can be generated. The updated training set (e.g., third graph data structure) can be generated if the GNN model's robustness metric is below the robustness threshold. The updated training set can be generated from the training set used to train the GNN model. The updated training data set can be generated using a data augmenter (e.g., data augmenter 2). The data augmenter can introduce errors into the training data set. The errors can be introduced by assigning a probability that an error will be added to a node. The errors can be the errors discussed above with relation to block 805.

At block 820, the GNN model can be trained on the updated training data set. The GNN model can trained by to generate a model that can classify nodes in the training data set. The nodes can be classified as being a key or value in a key-value pair.

Figure 9:
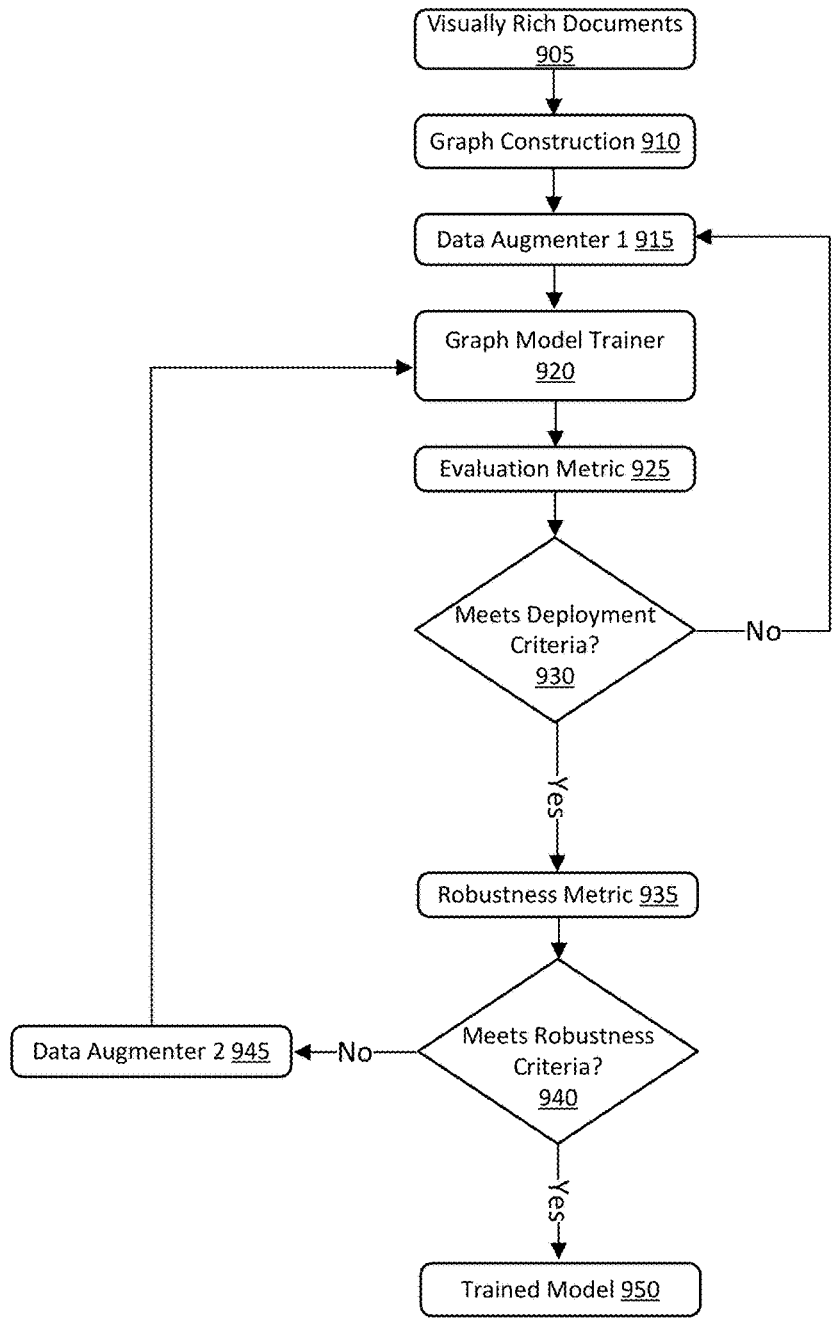
FIG. 9 is a process for training a model to satisfy a set of robustness metrics.
Figure 10:
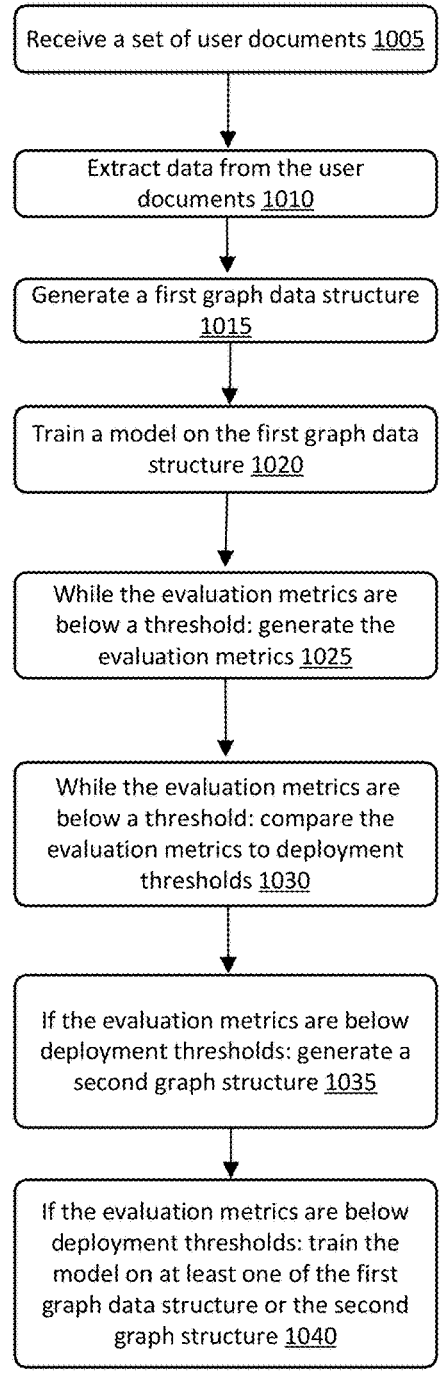
FIG. 10 shows a method for training a graph neural network (GNN) on an augmented training data set.

FIG. 9 shows a process 900 for data augmentation and training according to an embodiment.

Turning to process 900 in greater detail, at block 905, a set of visually rich documents can be received. The visually rich documents can be received at a computing device. The set of visually rich documents can be any document where information is conveyed by both the content and layout. Visually rich documents can include identification cards, passports, visas, credit cards, bank cards, checks, diplomas, professional credentials, receipts, etc. The visually rich documents can be provided as input to the computing device training the graph neural network (GNN) model as an image file (e.g., Joint Photographic Experts Group (JPEG) file, a Windows bitmap (BMP) file, a Portable Network Graphics (PNG) file, etc.).

At block 910, graphs can be constructed. Constructing the graphs can include identifying words in the visually rich documents. A graph can be constructed for a visually rich document. The words can be identified using optical character recognition (OCR). Nodes in the graph can contain the identified words. Edges can connect the graph's nodes. One edge can connect two nodes. The edges can indicate a distance between the words in the connected node. The words in the visually rich document can be bordered by boxes. The distance between the words in the connected nodes can be measured from a centroid of the boxes surrounding each of the words. The edges can also indicate that the two connected nodes are a key-value pair.

At block 915, the training data set's graphs can be augmented by the first data augmentation module (e.g., data augmenter 1). The graphs can be augmented to create perturbed views by deleting nodes. The graphs can also be augmented by deleting edges between nodes. In some circumstances edges and nodes can both be deleted to create a perturbed view. Generating perturbed views is discussed above with relation to FIG. 6.

At block 920, the GNN model can be trained using a graph neural network trainer. The GNN can be trained to classify nodes in the training data set's graphs as key-value pairs.

At block 925, the GNN is evaluated to determine the model's performance on an evaluation metric. The evaluation metric can be satisfied if an evaluation score exceeds a threshold. The evaluation score can be a F1 score. A F1 score can be generated using the following formula:

$$F_1 = 2 * \frac{\text{precision} * \text{recall}}{\text{precision} + \text{recall}} = \frac{\text{true\_positives}}{\text{true\_positives} + \frac{1}{2}(\text{false\_positives} + \text{false\_negatives})}$$

At decision block 930, if the evaluation metric is not satisfied, the training data set is augmented by the first augmenter. The GNN model is retrained on the augmented data and an evaluation score is generated for the retrained model. If the GNN model satisfies the evaluation metric, the model's performance on the robustness metric can be determined.

At block 935, the GNN model can be evaluated to determine if the model satisfies a robustness metric. The robustness metric can be a comparison between the GNN model's performance on a test data set without errors and the GNN model's performance on a test data set with errors. In some circumstances, the robustness metric can include a comparison to the GNN model's performance on more than one data set with errors. The model's performance can be evaluated using an evaluation score. The evaluation score can be a F1 score. The errors can include word order errors, spelling errors, keyboard errors, OCR errors, or character jumbling errors. In some circumstances the test data set with errors can include a single type of error (e.g., only spelling errors). The test data set with errors can include multiple types of errors.

At decision block 940, if the robustness metric is not satisfied, the training data set can be augmented with a second data augmentation module (e.g., data augmenter 2). The second data augmentation module can introduce errors into the training data set. The errors can be the same type of errors discussed with regard to block 935 above. The GNN model can be retrained on the augmented training data set using the graph model trainer. If the GNN model satisfies the robustness criteria the model can be provided as output. The GNN model can satisfy the robustness metric if the decrease in the GNN model's evaluation score for a test data set with errors is less than a threshold. The decrease is determined by comparing the evaluation score for a test set without errors to an evaluation score for a test set with errors.

At block 950, a trained GNN model can be received. If the GNN model has satisfied the evaluation metric and the robustness metric, the GNN can be ready for deployment as a service.

FIG. 10 shows a method 1000 for training a graph neural network (GNN) using an augmented training data set.

Turning to method 1000 in greater detail, at block 1005, a set of user documents can be received. The user documents can be visually rich documents. The visually rich documents can include drivers licenses, gun licenses, bank cards, checks, diplomas, professional credentials, passports, identification cards, etc. A visually rich document can be any document where information is conveyed by the document's content and layout.

At block 1010, data can be extracted from the user documents. The data can be extracted using optical character recognition (OCR). The data can include words that are identified in the document. The data can also include spatial information. The spatial information can include a coordinate location for the identified words. The data can also include an indication that a word is a key or a value in a key-value pair.

At block 1015, a first graph data structure can be generated using the extracted data. The first graph data structure can be a training data set. The graph data structure can include nodes connected by edges. The nodes can contain the words identified in the user documents. The nodes can indicate whether the word in the node is a key or a value in a key-value pair. The edges can connect two nodes. An edge can indicate whether the edge is connecting a key value pair. The edge can also indicate a distance between the words represented by the connected nodes. The distance can be the distance between the words in the user documents. The words in the user document can be bordered by a box. The distance indicated in the edge can be a distance between the coordinate location of the centroids of the boxes bordering the connected words. Generating a graph data structure is described in greater detail above in relation to FIG. 5.

At block 1020, the model can be trained on the first graph data structure. The model can be a GNN model. The model can be trained to identify nodes as a key or value belonging to a key-value pair. A key-value pair can contain more than one key. A key-value pair can contain more than one value.

At block 1025, while evaluation metrics are below a threshold, evaluation metrics can be generated. The evaluation metrics can be an evaluation score (e.g. F1 score). In some circumstances, the evaluation metrics can include more than one evaluation scores. The evaluation metrics can be generated based at least in part on the GNN model's performance categorizing nodes in a test data set. The GNN model can categorize the nodes as being a key or value in a key value pair.

At block 1030, while the evaluation metrics are below a threshold, the evaluation metrics can be compared to deployment thresholds. The deployment thresholds can include a minimum acceptable evaluation score.

At block 1035, in response to a determination that the set of evaluation metrics are below a set of deployment thresholds, a second graph structure can be generated. The second graph structure can be generated by augmenting the first graph structure. The first graph structure can be augmented using a first data augmentation module (e.g., data augmenter 1). The data can be augmented by creating new graphs (e.g., perturbed views) from the graphs in the first graph structure. The new graphs can be created by deleting nodes or edges from the graphs in the first data structure. The process for generating new graphs from the graphs in the first data set is described in greater detail above in relation to FIG. 6.

At block 1040, in response to a determination that the set of evaluation metrics are below a set of deployment thresholds, the model can be trained on at least one of the first or second graph structure. The model can be a GNN model. The model can be trained to identify nodes as a key or value belonging to a key-value pair. A key-value pair can contain more than one key. A key-value pair can contain more than one value.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
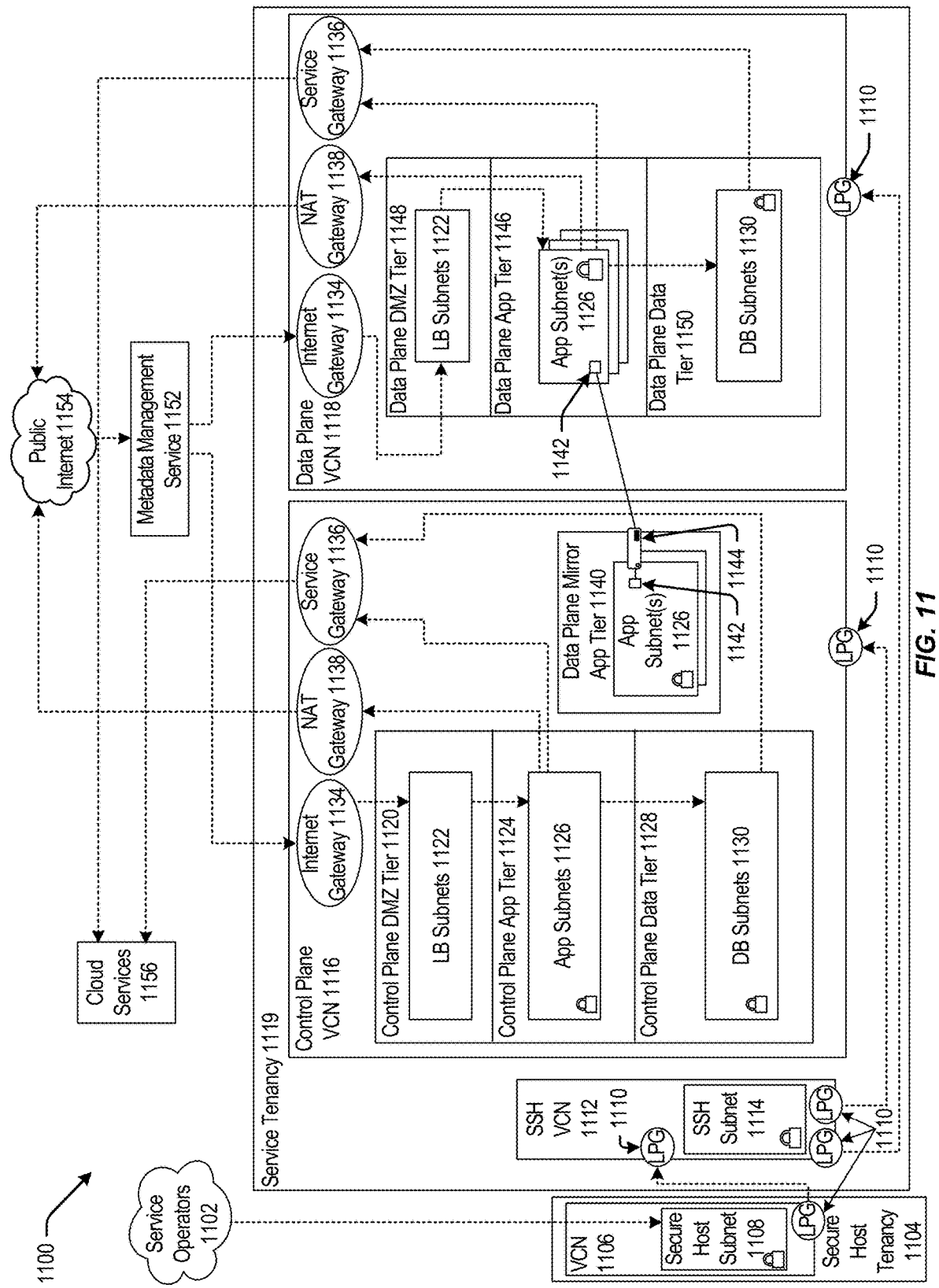
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
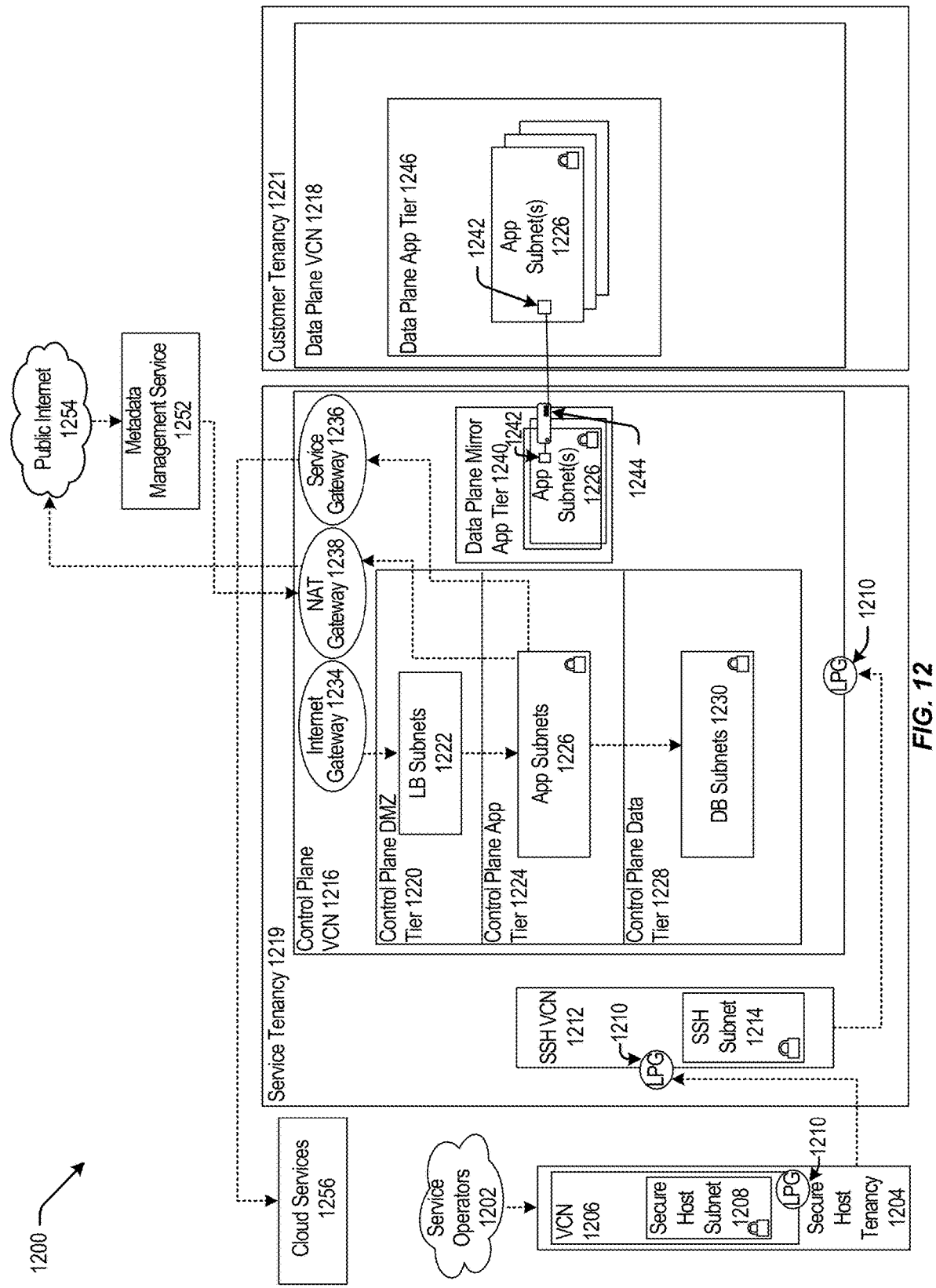
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1102 of FIG. 11) can be communicatively coupled to a secure host tenancy 1204 (e.g. the secure host tenancy 1104 of FIG. 11) that can include a virtual cloud network (VCN) 1206 (e.g. the VCN 1106 of FIG. 11) and a secure host subnet 1208 (e.g. the secure host subnet 1108 of FIG. 11). The VCN 1206 can include a local peering gateway (LPG) 1210 (e.g. the LPG 1110 of FIG. 11) that can be communicatively coupled to a secure shell (SSH) VCN 1212 (e.g. the SSH VCN 1112 of FIG. 11) via an LPG 1110 contained in the SSH VCN 1212. The SSH VCN 1212 can include an SSH subnet 1214 (e.g. the SSH subnet 1114 of FIG. 11), and the SSH VCN 1212 can be communicatively coupled to a control plane VCN 1216 (e.g. the control plane VCN 1116 of FIG. 11) via an LPG 1210 contained in the control plane VCN 1216. The control plane VCN 1216 can be contained in a service tenancy 1219 (e.g. the service tenancy 1119 of FIG. 11), and the data plane VCN 1218 (e.g. the data plane VCN 1118 of FIG. 11) can be contained in a customer tenancy 1221 that may be owned or operated by users, or customers, of the system.

The control plane VCN 1216 can include a control plane DMZ tier 1220 (e.g. the control plane DMZ tier 1120 of FIG. 11) that can include LB subnet(s) 1222 (e.g. LB subnet(s) 1122 of FIG. 11), a control plane app tier 1224 (e.g. the control plane app tier 1124 of FIG. 11) that can include app subnet(s) 1226 (e.g. app subnet(s) 1126 of FIG. 11), a control plane data tier 1228 (e.g. the control plane data tier 1128 of FIG. 11) that can include database (DB) subnet(s) 1230 (e.g. similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g. the service gateway of FIG. 11) and a network address translation (NAT) gateway 1238 (e.g. the NAT gateway 1138 of FIG. 11). The control plane VCN 1216 can include the service gateway 1236 and the NAT gateway 1238.

The control plane VCN 1216 can include a data plane mirror app tier 1240 (e.g. the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152 of FIG. 11) that can be communicatively coupled to public Internet 1254 (e.g. public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
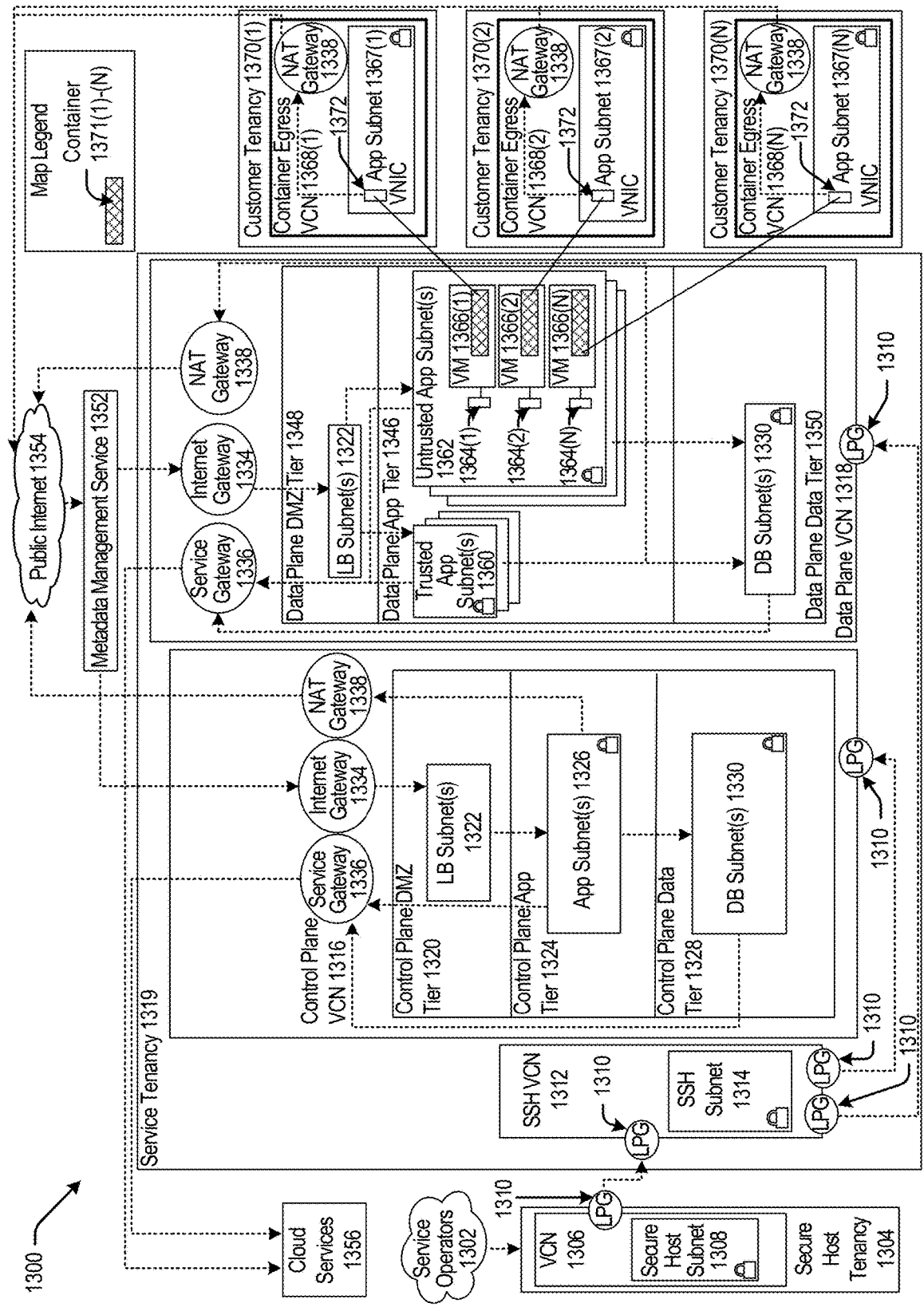
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1102 of FIG. 11) can be communicatively coupled to a secure host tenancy 1304 (e.g. the secure host tenancy 1104 of FIG. 11) that can include a virtual cloud network (VCN) 1306 (e.g. the VCN 1106 of FIG. 11) and a secure host subnet 1308 (e.g. the secure host subnet 1108 of FIG. 11). The VCN 1306 can include an LPG 1310 (e.g. the LPG 1110 of FIG. 11) that can be communicatively coupled to an SSH VCN 1312 (e.g. the SSH VCN 1112 of FIG. 11) via an LPG 1310 contained in the SSH VCN 1312. The SSH VCN 1312 can include an SSH subnet 1314 (e.g. the SSH subnet 1114 of FIG. 11), and the SSH VCN 1312 can be communicatively coupled to a control plane VCN 1316 (e.g. the control plane VCN 1116 of FIG. 11) via an LPG 1310 contained in the control plane VCN 1316 and to a data plane VCN 1318 (e.g. the data plane 1118 of FIG. 11) via an LPG 1310 contained in the data plane VCN 1318. The control plane VCN 1316 and the data plane VCN 1318 can be contained in a service tenancy 1319 (e.g. the service tenancy 1119 of FIG. 11).

The control plane VCN 1316 can include a control plane DMZ tier 1320 (e.g. the control plane DMZ tier 1120 of FIG. 11) that can include load balancer (LB) subnet(s) 1322 (e.g. LB subnet(s) 1122 of FIG. 11), a control plane app tier 1324

(e.g. the control plane app tier 1124 of FIG. 11) that can include app subnet(s) 1326 (e.g. similar to app subnet(s) 1126 of FIG. 11), a control plane data tier 1328 (e.g. the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 11) and a network address translation (NAT) gateway 1338 (e.g. the NAT gateway 1138 of FIG. 11). The control plane VCN 1316 can include the service gateway 1336 and the NAT gateway 1338.

The data plane VCN 1318 can include a data plane app tier 1346 (e.g. the data plane app tier 1146 of FIG. 11), a data plane DMZ tier 1348 (e.g. the data plane DMZ tier 1148 of FIG. 11), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154 of FIG. 11).

The Internet gateway 1334 contained in the control plane VCN 1316 and contained in the data plane VCN 1318 can be communicatively coupled to a metadata management service 1352 (e.g. the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
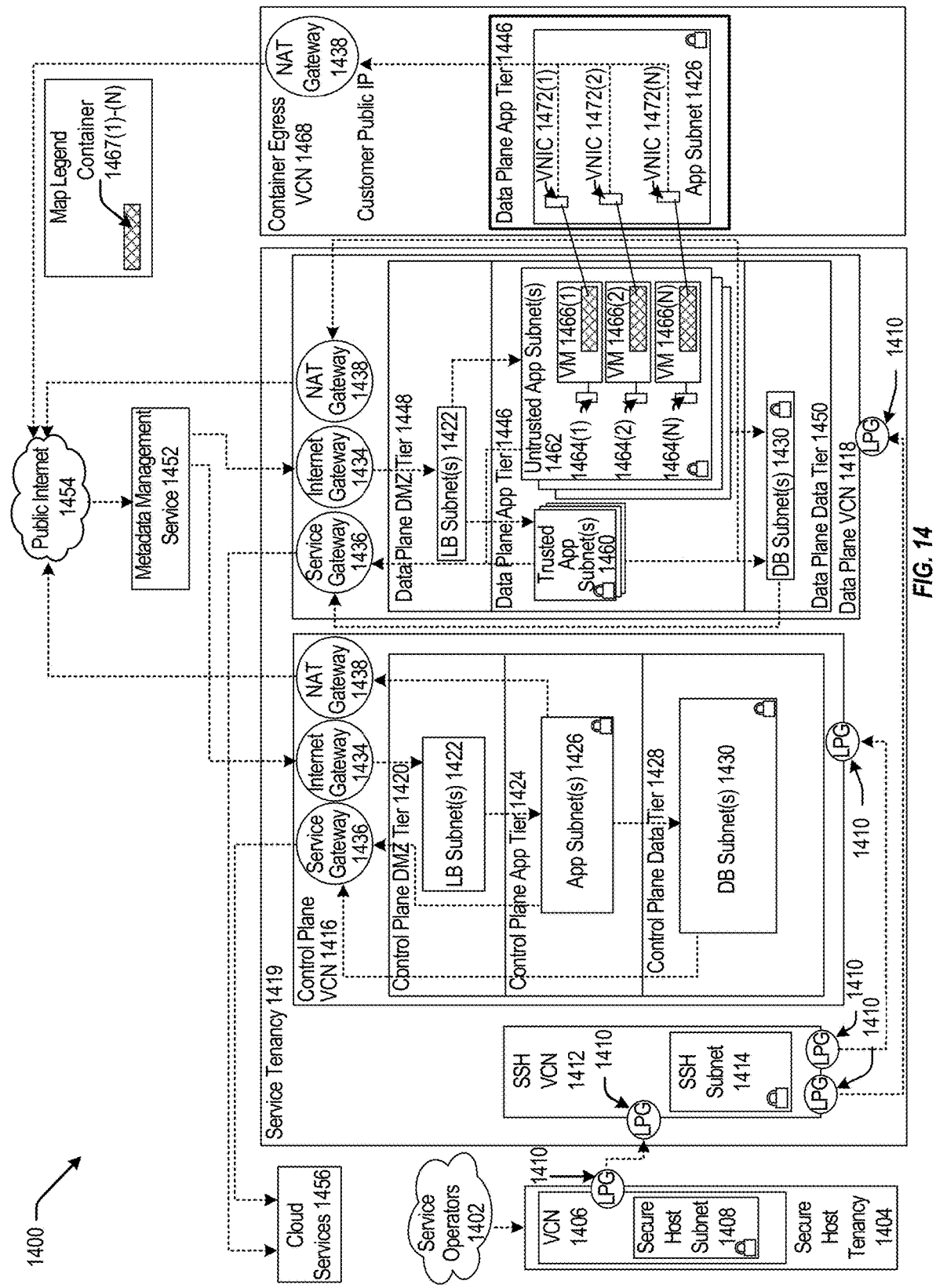
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1102 of FIG. 11) can be communicatively coupled to a secure host tenancy 1404 (e.g. the secure host tenancy 1104 of FIG. 11) that can include a virtual cloud network (VCN) 1406 (e.g. the VCN 1106 of FIG. 11) and a secure host subnet 1408 (e.g. the secure host subnet 1108 of FIG. 11). The VCN 1406 can include an LPG 1410 (e.g. the LPG 1110 of FIG. 11) that can be communicatively coupled to an SSH VCN 1412 (e.g. the SSH VCN 1112 of FIG. 11) via an LPG 1410 contained in the SSH VCN 1412. The SSH VCN 1412 can include an SSH subnet 1414 (e.g. the SSH subnet 1114 of FIG. 11), and the SSH VCN 1412 can be communicatively coupled to a control plane VCN 1416 (e.g. the control plane VCN 1116 of FIG. 11) via an LPG 1410 contained in the control plane VCN 1416 and to a data plane VCN 1418 (e.g. the data plane 1118 of FIG. 11) via an LPG 1410 contained in the data plane VCN 1418. The control plane VCN 1416 and the data plane VCN 1418 can be contained in a service tenancy 1419 (e.g. the service tenancy 1119 of FIG. 11).

The control plane VCN 1416 can include a control plane DMZ tier 1420 (e.g. the control plane DMZ tier 1120 of FIG. 11) that can include LB subnet(s) 1422 (e.g. LB subnet(s) 1122 of FIG. 11), a control plane app tier 1424 (e.g. the control plane app tier 1124 of FIG. 11) that can include app subnet(s) 1426 (e.g. app subnet(s) 1126 of FIG. 11), a control plane data tier 1428 (e.g. the control plane data tier 1128 of FIG. 11) that can include DB subnet(s) 1430 (e.g. DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146 of FIG. 11), a data plane DMZ tier 1448 (e.g. the data plane DMZ tier 1148 of FIG. 11), and a data plane data tier 1450 (e.g. the data plane data tier 1150 of FIG. 11). The data plane DMZ tier 1448 can include LB subnet(s) 1422 that can be communicatively coupled to trusted app subnet(s) 1460 (e.g. trusted app subnet(s) 1360 of FIG. 13) and untrusted app subnet(s) 1462 (e.g. untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154 of FIG. 11).

The Internet gateway 1434 contained in the control plane VCN 1416 and contained in the data plane VCN 1418 can be communicatively coupled to a metadata management service 1452 (e.g. the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
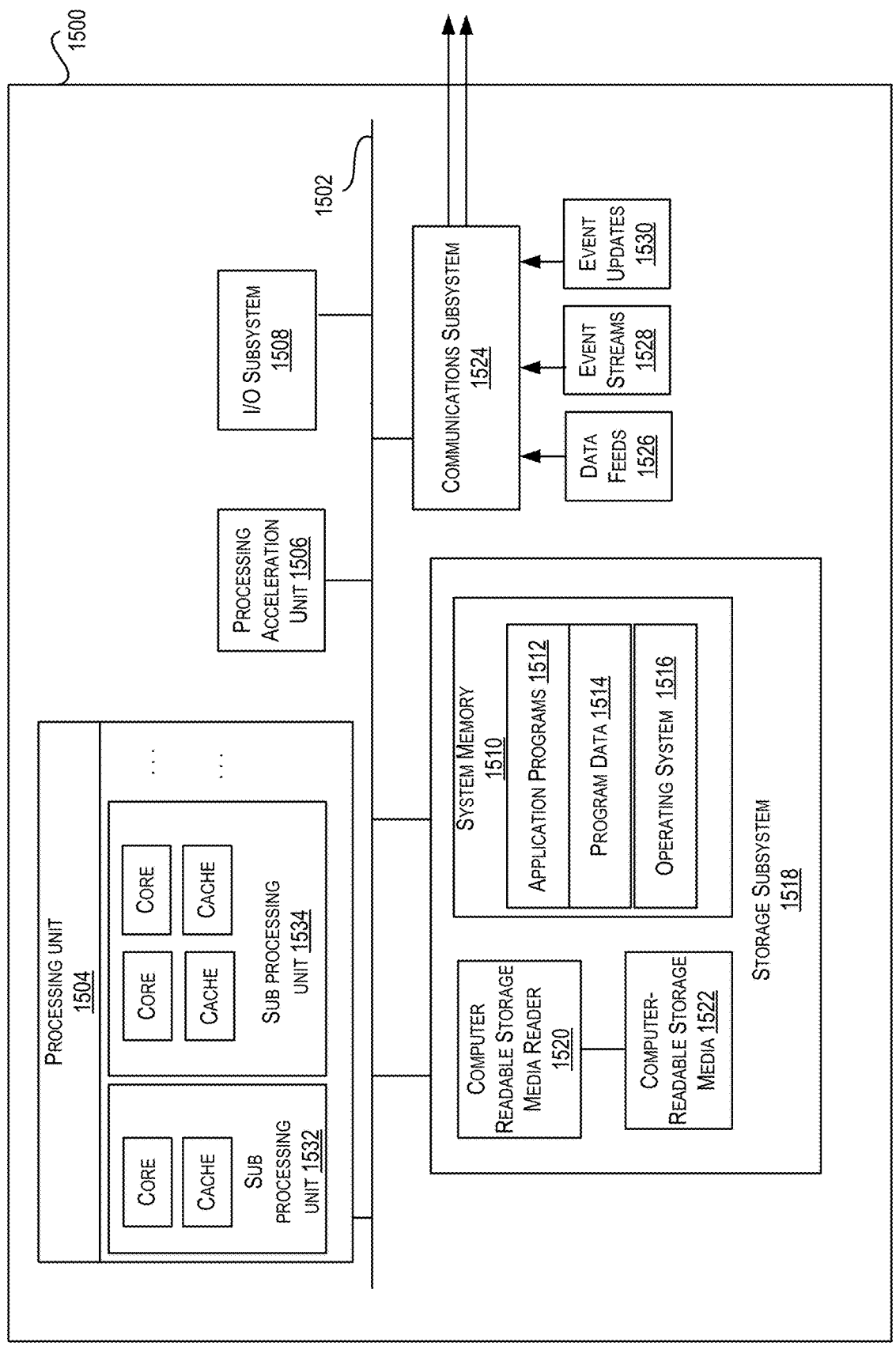
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
receiving, at a computing device, a set of user documents;
extracting, by the computing device, data from the set of user documents;
generating, by the computing device, a first graph data structure with one or more initial graphs containing the data extracted from the set of user documents, the data including a set of key-value pairs;
training, by the computing device, a model on the first graph data structure to classify the set of key-value pairs;
until a set of evaluation metrics for the model exceeds a set of deployment thresholds:
generating, by the computing device, the set of evaluation metrics for the model;
comparing, by the computing device, the set of evaluation metrics to the set of deployment thresholds; and
in response to a determination that the set of evaluation metrics are below the set of deployment thresholds:
generating, by the computing device, one or more new graphs from the one or more initial graphs in the first graph data structure to produce a second graph data structure; and
training, by the computing device, the model on the second graph data structure.

2. The method of claim 1, wherein generating the one or more new graphs to produce the second graph data structure further comprises:
receiving, by the computing device, the one or more initial graphs from the first graph data structure;
deleting, by the computing device, one or more edges and nodes in one or more graphs of the one or more initial graphs to produce one or more new graphs; and
storing, by the computing device, the one or more new graphs in the first graph data structure to produce the second graph data structure.

3. The method of claim 2, wherein deleting one or more edges and nodes further comprises:
determining, by the computing device, an occurrence metric, the occurrence metric comprising a frequency distribution of a set of node labels;

determining, by the computing device, an importance metric, the importance metric comprising a weight for the set of node labels;
determining, by the computing device, a proximity metric; and
deleting, by the computing device, one or more edges and nodes based at least in part on one or more of the occurrence metric, the importance metric or the proximity metric.

4. The method of claim 1, further comprising:
until a set of robustness metrics for the model exceeds a set of robustness thresholds;
generating, by the computing device, the set of robustness metrics for the model;
comparing, by the computing device, the set of robustness metrics to the set of robustness thresholds; and
in response to a determination that the set of robustness metrics are below the set of robustness thresholds:
altering, by the computing device, key-value pairs in the second graph data structure to produce a third graph data structure; and
training, by the computing device, the model on at least one of the first graph data structure, the second graph data structure, or the third graph data structure to classify key-value pairs.

5. The method of claim 4, wherein altering the key-value pairs in the second graph data structure further comprises:
changing, by the computing device, a sequence of words in one or more key-value pairs in the second graph data structure; and
changing, by the computing device, a spelling of one or more words in one or more key-value pairs in the second graph data structure.

6. The method of claim 1, wherein the user documents include at least one of: drivers licenses, gun licenses, passports, bank cards, employee identification (ID) card, college identification (ID) card, or checks.

7. The method of claim 1, wherein the data is extracted from the user documents using optical character recognition (OCR).

8. A non-transitory computer-readable storage medium storing a set of instructions, that, when executed by one or more processors of a computer device, cause the one or more processors to perform:
receiving a set of user documents;
extracting data from the set of user documents;
generating a first graph data structure with one or more initial graphs containing the data extracted from the set of user documents, the data including a set of key-value pairs;
training a model on the first graph data structure to classify the set of key-value pairs;
until a set of evaluation metrics for the model exceeds a set of deployment thresholds:
generating the set of evaluation metrics for the model;
comparing the set of evaluation metrics to the set of deployment thresholds; and
in response to a determination that the set of evaluation metrics are below the set of deployment thresholds:
generating one or more new graphs from the one or more initial graphs in the first graph data structure to produce a second graph data structure; and
training the model on the second graph data structure.

9. The computer-readable storage medium of claim 8, wherein generating the one or more new graphs to produce the second graph data structure further comprises:
receiving the one or more initial graphs from the first graph data structure;
deleting one or more edges and nodes in one or more graphs of the one or more initial graphs to produce one or more new graphs; and
storing the one or more new graphs in the first graph data structure to produce the second graph data structure.

10. The computer-readable storage medium of claim 9, wherein deleting one or more edges and nodes further comprises:
determining an occurrence metric, the occurrence metric comprising a frequency distribution of a set of node labels;
determining an importance metric, the importance metric comprising a weight for the set of node labels;
determining a proximity metric; and
deleting one or more edges and nodes based at least in part on one or more of the occurrence metric, the importance metric or the proximity metric.

11. The computer-readable storage medium of claim 8, wherein the set of instructions further comprise instructions for:
until a set of robustness metrics for the model exceeds a set of robustness thresholds;
generating the set of robustness metrics for the model;
comparing the set of robustness metrics to the set of robustness thresholds; and
in response to a determination that the set of robustness metrics are below the set of robustness thresholds:
altering key-value pairs in the first or second graph data structure to produce a third graph data structure; and
training the model on at least one of the first graph data structure, the second graph data structure, or the third graph data structure to classify key-value pairs.

12. The computer-readable storage medium of claim 11, wherein altering the key-value pairs in either the first or second graph data structure further comprises:
changing a sequence of words in one or more key-value pairs in at least one of the first or second graph data structure; and
changing a spelling of one or more words in one or more key-value pairs in the second graph data structure.

13. The computer-readable storage medium of claim 8, wherein the user documents include at least one of drivers licenses, gun licenses, passports, bank cards, employee identification (ID) card, college identification (ID) card, or checks.

14. The computer-readable storage medium of claim 8, wherein the data is extracted from the user documents using optical character recognition (OCR).

15. A system, comprising:
memory storing computer-executable instructions; and
one or more processors configured to access the memory, and execute the computer-executable instructions to at least:
receive a set of user documents;
extract data from the set of user documents;
generate a first graph data structure with one or more initial graphs containing the data extracted from the set of user documents, the data including a set of key-value pairs;

train a model on the first graph data structure to classify the set of key-value pairs;
until a set of evaluation metrics for the model exceeds a set of deployment thresholds:
  generate the set of evaluation metrics for the model;
  compare the set of evaluation metrics to the set of deployment thresholds; and
  in response to a determination that the set of evaluation metrics are below the set of deployment thresholds:
    generate one or more new graphs from the one or more initial graphs in the first graph data structure to produce a second graph data structure; and
    train the model on the second graph data structure.

16. The system of claim 15, wherein generating the one or more new graphs to produce the second graph data structure further comprises instructions to:
receive the one or more initial graphs from the first graph data structure;
delete one or more edges and nodes in one or more graphs of the one or more initial graphs to produce one or more new graphs; and
store the one or more new graphs in the first graph data structure to produce the second graph data structure.

17. The system of claim 16, wherein the instructions to delete one or more edges and nodes further comprises instructions to:
determine an occurrence metric, the occurrence metric comprising a frequency distribution of a set of node labels;
determine an importance metric, the importance metric comprising a weight for the set of node labels;
determine a proximity metric; and
delete one or more edges and nodes based at least in part on one or more of the occurrence metric, the importance metric or the proximity metric.

18. The system of claim 15, further comprising instructions to:
until a set of robustness metrics for the model exceeds a set of robustness thresholds;
  generate, the set of robustness metrics for the model;
  compare the set of robustness metrics to the set of robustness thresholds; and
  in response to a determination that the set of robustness metrics are below the set of robustness thresholds:
    alter key-value pairs in the second graph data structure to produce a third graph data structure; and
    train the model on at least one of the first graph data structure, the second graph data structure, or the third graph data structure to classify key-value pairs.

19. The system of claim 18, wherein altering the key-value pairs in the second graph data structure further comprises instructions to:
change a sequence of words in one or more key-value pairs in the second graph data structure; and
change a spelling of one or more words in one or more key-value pairs in the second graph data structure.

20. The system of claim 15, wherein the user documents include at least one of: drivers licenses, gun licenses, passports, bank cards, employee identification (ID) card, college identification (ID) card, or checks.

* * * * *